United States Patent [19]
Lewis

[11] Patent Number: 5,488,411
[45] Date of Patent: Jan. 30, 1996

[54] INTERACTIVE SYSTEM FOR A CLOSED CABLE NETWORK

[75] Inventor: Scott W. Lewis, Saratoga, Calif.

[73] Assignee: Multimedia Systems Corporation, San Jose, Calif.

[21] Appl. No.: 212,353

[22] Filed: Mar. 14, 1994

[51] Int. Cl.[6] .................................................. H04N 7/173
[52] U.S. Cl. ................................. 348/8; 348/6; 455/6.3
[58] Field of Search ............................... 348/6, 8, 12, 13, 348/3, 5, 14, 15; 455/5.1, 6.1, 6.3; 358/86, 85; H04N 7/16, 7/173, 7/14, 7/15

[56] References Cited

U.S. PATENT DOCUMENTS

| | | | |
|---|---|---|---|
| 4,787,085 | 11/1988 | Suto et al. | 348/6 |
| 4,885,747 | 12/1989 | Fogila | 348/8 |
| 4,920,432 | 4/1990 | Eggers et al. | 348/8 |
| 4,926,256 | 5/1990 | Nanba | 348/8 |
| 4,935,924 | 6/1990 | Baxter | 455/6.1 |
| 5,193,208 | 3/1993 | Yokota et al. | 455/6.3 |
| 5,247,347 | 9/1993 | Litteral et al. | 455/4.2 |
| 5,318,450 | 6/1994 | Carver | 348/8 |

FOREIGN PATENT DOCUMENTS 488289  6/1992  European Pat. Off. ......... H04N 7/14

*Primary Examiner*—James J. Groody
*Assistant Examiner*—Chris Grant
*Attorney, Agent, or Firm*—Benman Collins & Sawyer

[57] ABSTRACT

A system is provided that enhances the interactivity of multimedia information in a closed cable network such as a hotel system or the like. The system includes a multimedia processing plurality of multimedia processing system, a telephone switching system, a video control system, a service operations platform, and a plurality of interactive devices. This system has the advantage of providing compression and/or transmission algorithms to maximize enhancement of the multimedia information. The system allows for enhanced interactivity within a closed cable system with minimum modification to the existing network.

12 Claims, 26 Drawing Sheets

900

INTERACTIVE SYSTEM FOR A CLOSED CABLE NETWORK

FIELD OF THE INVENTION

The present invention relates to a closed cable network and more particularly the present invention relates to the interactive transfer of multimedia information within such a network.

BACKGROUND OF THE INVENTION

There are many types of closed cable networks. What is meant by closed cable networks in the context of this application are networks which are self-contained and have a specified number of users. For example, a hotel or hospital would contain such networks. In such networks, there are a series of connections to each room or the like for presentation of various multimedia information. Oftentimes this information takes the form of video material that is provided to each of the customers or patients. The characteristic of these types of networks is that there is a feedback path that provides the owner of the network with knowledge of the activities of the particular user on the network. Hence, in the case of a hotel system, if a person orders a service there is a way for the owner of the network to know that the service has been ordered by that particular person. The major problem with existing closed cable networks are that they are not fully interactive. That is, there is no way to actively select multimedia information from outside of the network in real time. Accordingly, what is needed is a system for allowing a user of such a network to interactively access information outside of the network without requiring additional equipment within each user location. In addition, the system should be one that does not affect the normal operation of the existing closed cable system. The present invention addresses such a need.

SUMMARY OF THE INVENTION

A closed cable network for interactive multimedia transmission comprises a services operation platform system for receiving program materials from customers and a multimedia processing system responsive to the program materials for providing information. The network further includes means for transmitting and receiving telephone messages coupled to the multimedia processing system, a video control unit coupled to the processing system and a plurality of interactive multimedia devices (IMDs) for receiving and transmitting multimedia information to and from the multimedia processing system.

In another aspect, an interactive system for a closed cable network comprises means for processing multimedia information; means coupled to the multimedia processing means for receiving telephone messages from and transmitting telephone messages to the multimedia processing means; means coupled to the multimedia processing means for receiving account information from and transmitting account information to the multimedia processing means; means coupled to the multimedia processing means for receiving control information from and transmitting control information to the multimedia processing means; and a plurality of interactive devices coupled to the multimedia processing means.

The interactive devices are utilized to vastly increase the amount of information that can be processed through a closed cable network. In one aspect, the network is utilized to provide a reservation system for pay per view movies, catalog shopping, ticketing or the like through the network.

DETAILED DESCRIPTION OF THE INVENTION

The present invention relates to an interactive system for a closed cable network. The following description is presented to enable one of ordinary skill in the art to make and use the invention and is provided in the context of a patent application and its requirements. Various modifications to the preferred embodiment will be readily apparent to those skilled in the art and the generic principles and features described herein may be applied to other embodiments. Thus the present invention is not intended to be limited to the embodiment shown but is to be accorded the widest scope consistent with the principles and features described herein.

Figure 1:
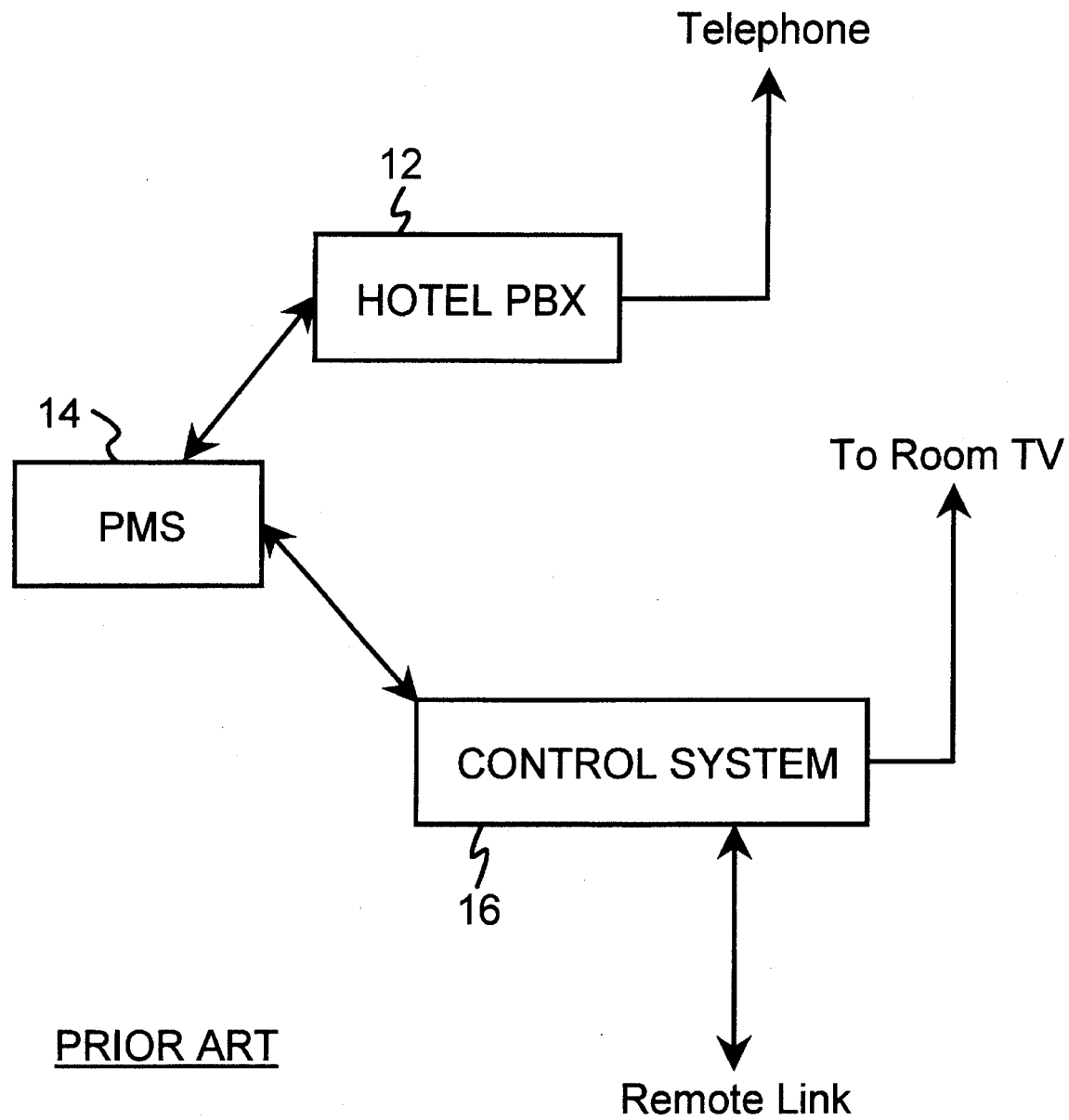
FIG. 1 is a block diagram of a prior art closed cable network.

Referring now to FIG. 1, what is shown in simple block diagram form is a prior art closed cable network. In the following discussion the present invention will be discussed in the context of a hotel system. It should be understood however that there are other types of closed cable networks such as hospitals, educational institutions and many conventional cable head end networks or the like where the principles of the present invention would apply.

The system 10 includes a hotel PBX system 12 for receiving and transmitting telephone calls, property management system 14 and a video control system 16 which could be used to access the pay per view movies or the like. The video control system 16 includes an in-room remote link and is connected to the services operation platform 14. The property management system (PMS) 14 keeps track of the users that order the movies.

The system 10 as above described is not fully interactive. In this type of system there are a number of video units or VCRs located within the system and they are switched in when the appropriate customer or client wants to use the video unit. Hence, these video units cannot be individualized to a particular user because there are simply not enough units. For example, there may be a bank of 64 VCRs which would service a 500 room hotel. Each of the VCRs would have a separate movie. Accordingly, in this case there is a possibility that a particular movie would not be available. In addition, this type of arrangement severely limits the number of choices available.

Before the present invention is described in detail certain background information should be discussed to clarify the utility of the present invention in terms of existing closed cable networks. In a multimedia system, various sensory information is provided to a receiver. In the case of video information, this information takes the form of foreground and background images that display a particular scene. In the case of audio information, the foreground and background signals are such that the foreground information is speech and the background information is music.

Typically, multimedia systems in whatever form provide this information over a single transmission line. In so doing, the amount and quality of the multimedia information is severely limited by the bandwidth of the transmission line.

The present invention first differentiates between important and less important multimedia information by separating the information into primary and secondary layers through the use of a program model to minimize the bandwidth limitations. In such a system each layer will have its own set of parameters that are important psychographically, however, the secondary layer will not vary as much as the primary layer.

What is meant by a program model refers to psychographic parameters within the multimedia system, that is parameters that relate to an individual's sensory perceptions when encountering multimedia information. These parameters comprise a set of unique and consistent elements for a particular class of multimedia information. In accordance with the present invention, its multimedia information is separated into different layers in accordance with the program model. Therefore, by way of example, in the instance of video images, the foreground and background information might be divided into different layers. Similarly, in the case of audio information, the news information, weather information, or the like may be one layer whereas the background music may be the other layer.

In the present invention, these layers will be divided into primary and secondary layers in accordance with the information's importance relative to the program model. The most important information is identified and enhanced to provide the best quality information to the receiver of the multimedia information.

In the preferred embodiment, the primary layers will be enhanced in such a way to provide a perceived improvement in quality of the multimedia information presented. In one embodiment the secondary layers are presented that may or may not be enhanced. Thereby the important information or the primary layers that are to be transmitted can be identified and selectively enhanced in accordance with the present invention.

In addition, the primary layers generally can be enhanced through critical psychographic parameters take the form of spatial, color, audio, and temporal variables that occur in the primary or secondary layers.

In a closed cable network such as a hotel system it is important that the multimedia information that is produced, transmitted and received is enhanced in some manner. This is necessary to ensure that high fidelity, high quality information is presented to the viewer. Therefore, it will be possible to bring a superior product into the network. It is known, for example, it has been possible to provide video information over the telephone lines. However, it has been a problem sending high quality video information due to the bandwidth requirements that are needed to provide such high quality video information.

The present invention is directed towards a method and apparatus for enhancing the interactive multimedia information that is utilized within a closed cable network. To more fully explain such a method and apparatus, refer now to FIGS. 2–5 which shows a block diagram of a general embodiment and block diagrams of two specific embodiments of the overall system architecture for an enhanced interactive multimedia system for a closed cable network. The overall architecture would be connected to the hotel PBX or the like so as to readily access the transmission lines located therein.

Figure 2:
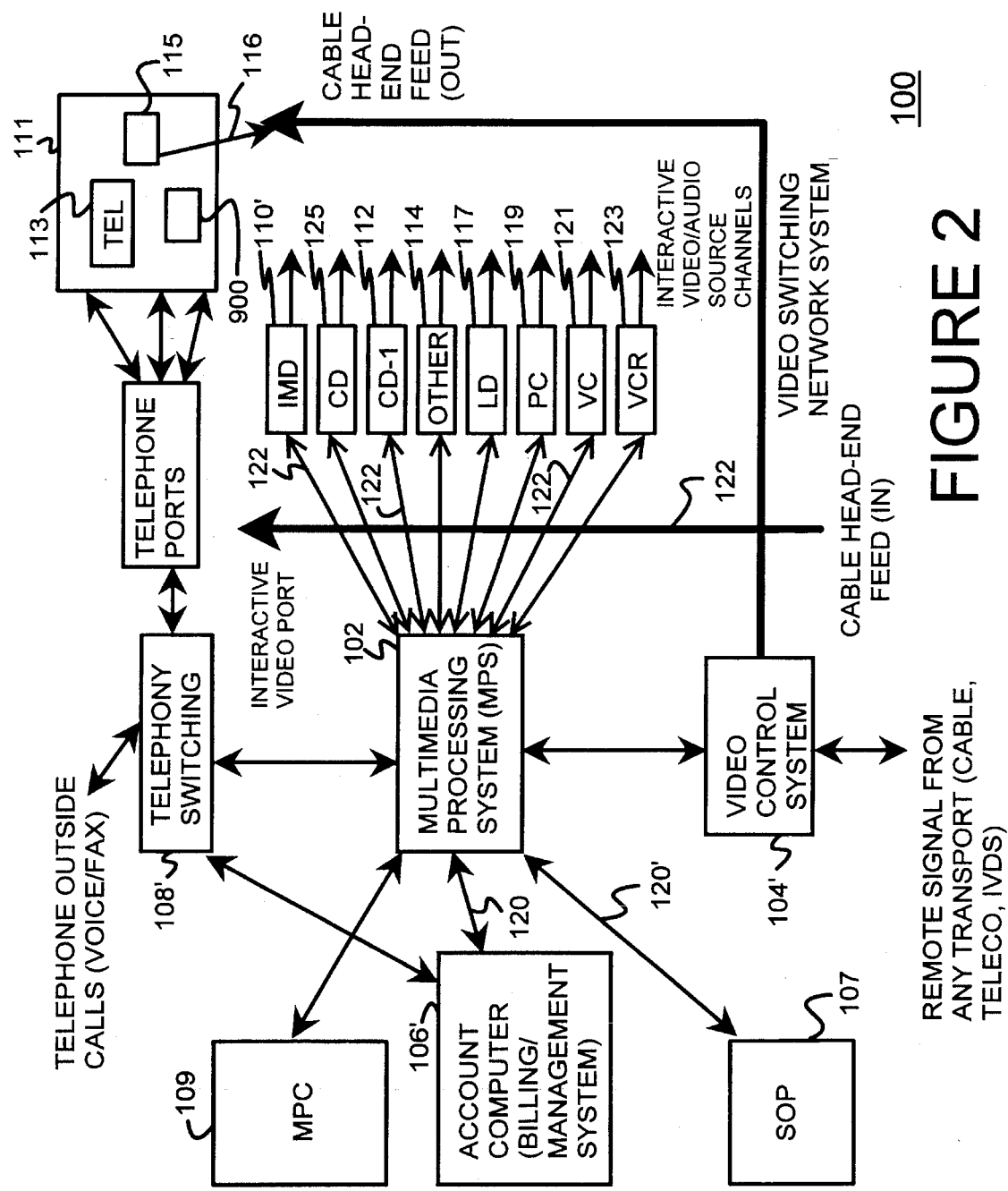
FIG. 2 is a block diagram of a general embodiment of an interactive multimedia system for use in a closed cable network.

Referring first to FIG. 2, the overall general architecture 100 includes a multimedia processing system (MPS) 102 which is coupled to receive information from and transmit information to a video control system 104, an account computer 106, a service operations platform SOP 107, and a telephony switching system 108. The MPS 102 is also coupled to an interactive multimedia decoder (IMD) 110, a CD/I device 112, a laser disk 117, video camera 121, compact disk (CD) player 125, personal computer (PC) 119, video camera recorder (VCR) 123 and other devices 114. In this system each of these devices can be utilized to provide updatable multimedia information. For example, a compact disk player 125 can be utilized to jump to different places to provide multimedia information. It could be utilized in conjunction with an IMD to augment the fixed media with interactive material (updatable video source) material.

Figure 2A:
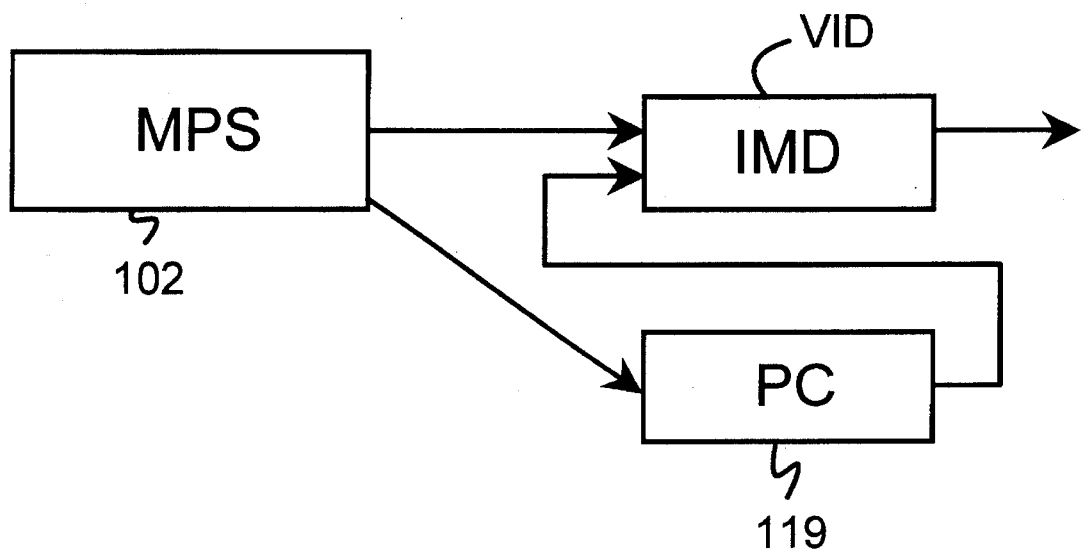
FIG. 2a is a block diagram of a personal computer and an IMD utilized in the system of FIG. 2.

A personal computer 119 can be utilized in conjunction with the IMD 110 as shown in FIG. 2a to mesh a composite signal (audio, video) utilizing a multimedia selection. Some examples for the use of such a system are on-line services, games or maps and the like.

A VCR 123 or CD player 125 could be utilized in such a system, for example, movie preview, catalog shopping, and a music listening system. Through this system full interactivity could be obtained.

Figure 2B:
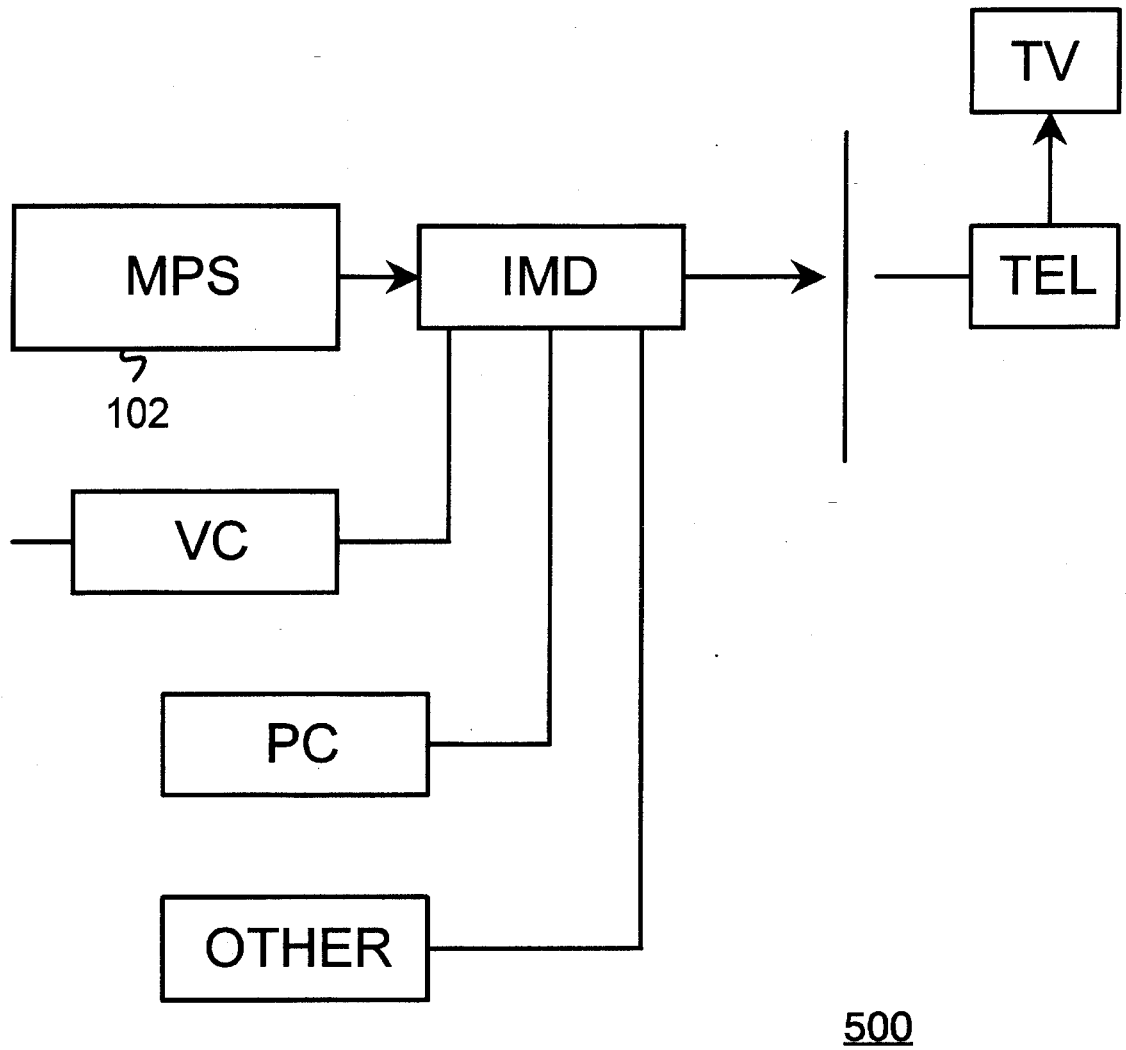
FIG. 2b is a block diagram of a point to point system utilized in the system of FIG. 2.

Video conferencing can be implemented for point to point or point to multiple point video conferencing. For example, referring now to FIG. 2b, what is shown is a point to multiple point video conference system 500. In this type of system, a video conference room (VC) can be utilized to transmit to multiple sites. This system can be utilized with the IMD 110 to provide updatable multimedia information.

Similarly, a point to point system, in which there is a video camera in each guest's room, can be utilized. In this embodiments a video multiplexer can be utilized to send updatable multimedia information from point to point (room to room) dependent on the type of information presented.

Figure 2C:
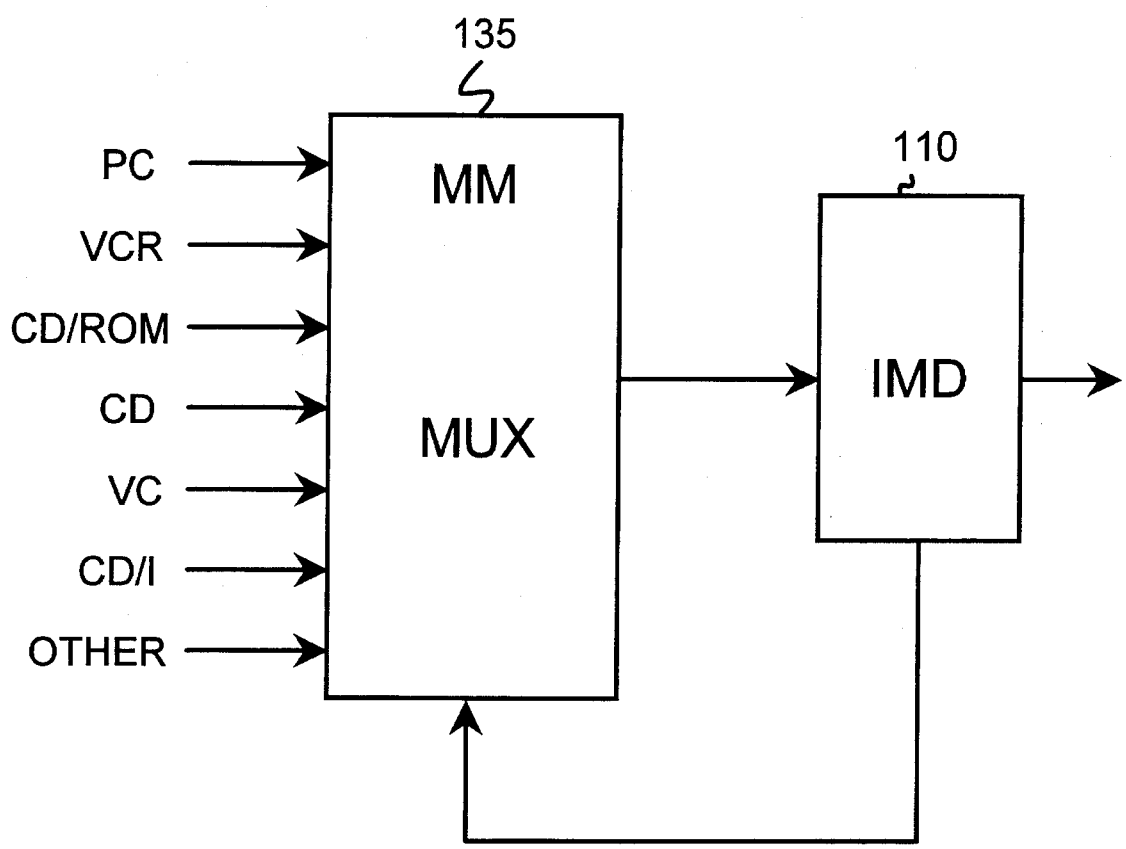
FIG. 2c is a block diagram of a multimedia multiplexer coupled to an interactive multimedia decoder.

An advantage of this system is to provide means for switching between alternate multimedia information at the head end. This allows for switching between analog and digital; data and graphics, music and video, etc. To more fully explain the advantage of this feature refer now to FIG. 2c. FIG. 2c shows a multimedia multiplexer (MM) 135 coupled to an IMD 110. In this embodiment the MM 135 can send information from a plurality multimedia sources to the IMD 110.

Figure 2D:
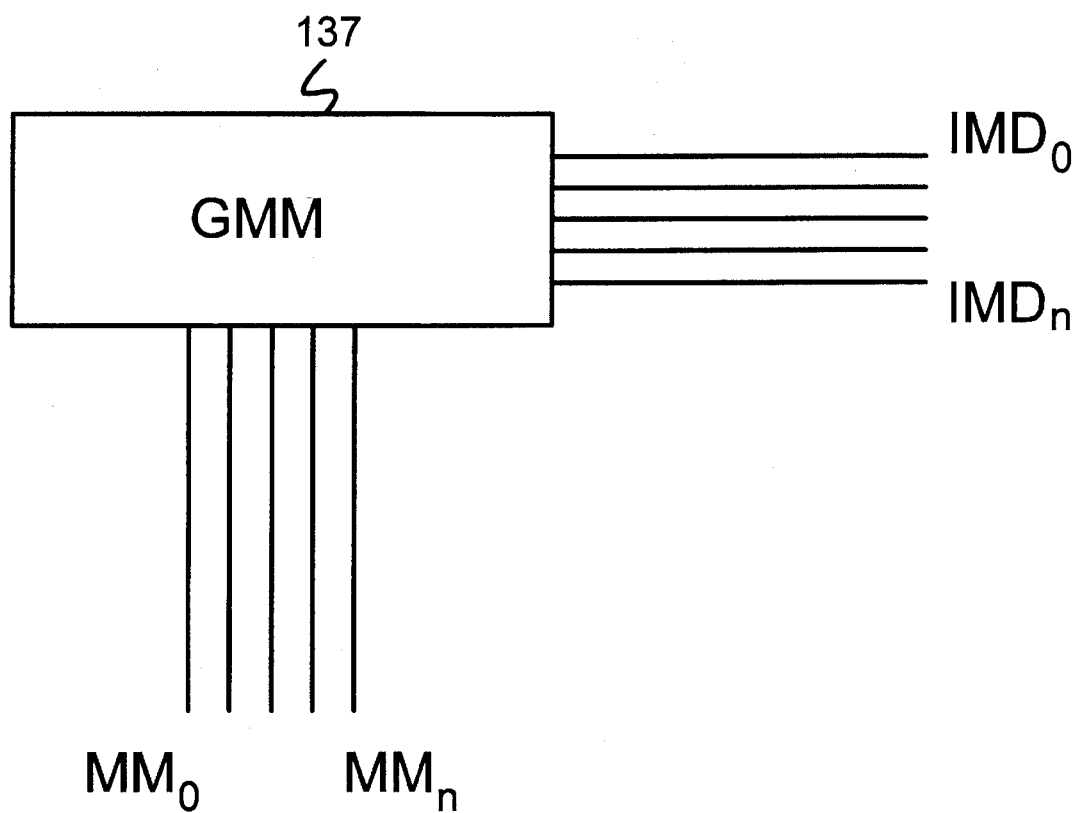
FIG. 2d is a block diagram of a global multimedia decoder.

In a preferred embodiment to provide for maximum resource allocation refer now to FIG. 2d which shows a global multimedia multiplexer (GMM) 137. The GMM 137 would typically include a plurality of multimedia lines ($mm_0$–$mm_n$) for receiving multimedia source material. The GMM 137 receives information from a plurality of multimedia devices such as a PC, VCR, LD, CD-ROM, and CD/I devices. The output of the GMM 137 is provided to a plurality of IMDs 110 ($IMD_0$–$IMD_n$). The GMM 137 receives signals from a control channel 139 either from a MPS or the IMDs or other outside source. Through this device any multimedia source or combination of sources ($mm_0$–$mm_n$) can be directed to any decoder or interactive channel ($IMD_0$–$IMD_n$). This GMM 137 can be implemented in a variety of ways, for example, it can be a digital crosspoint switch. Through such a device a combination of multimedia devices can be utilized to produce a composite signal.

Referring back to FIG. 2, the cable feed line in turn is coupled to the video control system 104. The account computer 106 and the SOP 107 are also directly coupled to the telephone switching system 108 via lines 120 and 120', respectively. The telephone switching system 108 is capable of sending and receiving outside calls. The video control system 104 is capable of sending and receiving a remote signal from a cable system, telecommunication system or the like.

Another portion of the invention is an interactive voice response system 111. This system includes a telephone 113 which connects to the telephony switching 108 via telephone links. The telephone 113 also could include a credit card slot. There is also included within the system 111, a remote control 900 which will be described in detail later and a television 115 which is coupled to the cable 116.

In this general embodiment, the multimedia processing system (MPS) 102 receives program source material from the SOP 107 and from the control system 104. The control system 04 can be a pay per view system such as a On-Command™ Video or a different type of service, such as a shopping, buying movie or airline tickets, or the like. The MPS can also operate an interactive voice response program independently or integrated into other interactive multimedia programs.

The SOP 107 is utilized for receiving facsimile and voice messages. The SOP 107 can also be utilized in conjunction with pagers and the like to relay messages. By linking the account computer 106 to MPS 102 messages can be displayed on a monitor within the guest room. In addition, faxes can be displayed on the television and could be forwarded to other locations.

Figure 2E:
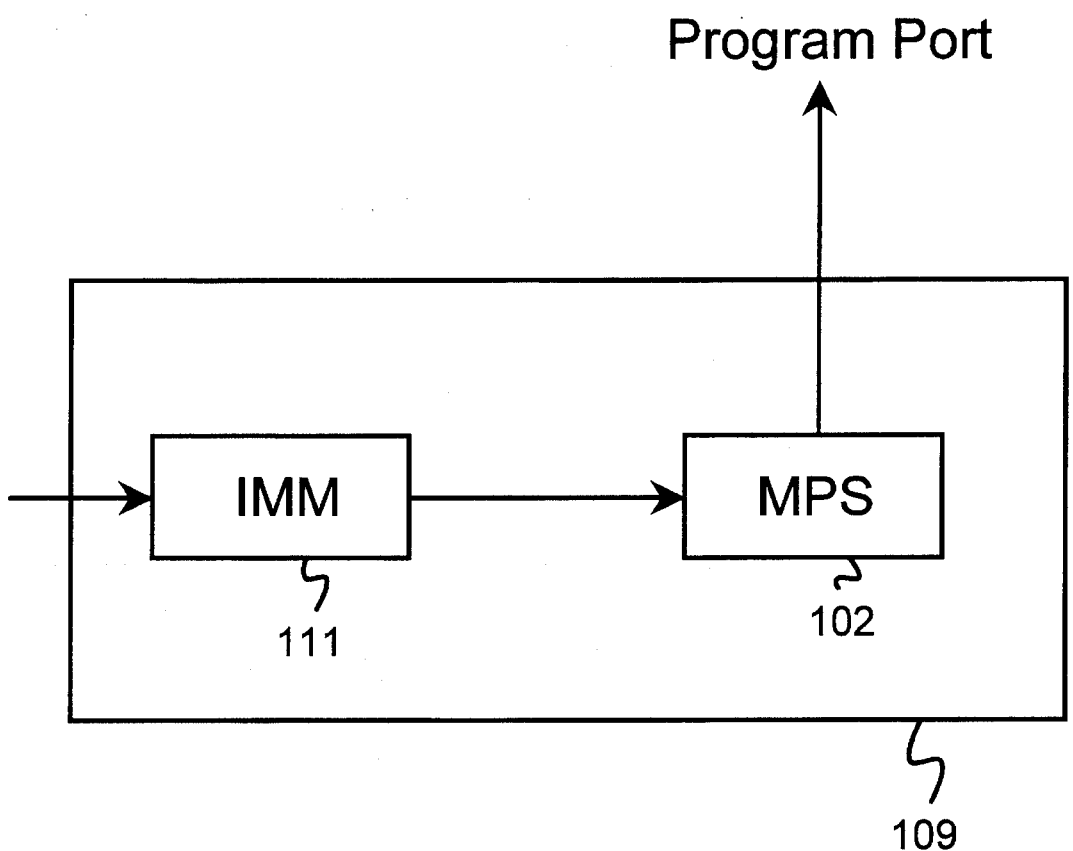
FIG. 2e is a block diagram of a multimedia processing center (MPC) in accordance with the system of FIG. 2.

A master multimedia processing center (MPC) 109 is also coupled to the closed cable system 100 via connection to the MPS 102. The MPC 109 is coupled to a plurality of closed cable systems to provide enhanced interactivity thereto. Referring now to FIG. 2e what is shown is a block diagram of the MPC 109. The MPC 109 comprises an interactive multimedia mastering system 111 which receives program source material from various outside sources and a MPS 102 which receives source material from the IMM 111 and can also receive data information over a program port 113 and an auxiliary port 115.

Referring back to FIG. 2, a critical portion of the system 100 is the telephone switching system 108 interface. Through the use of this architecture the switching system 108 can be controlled to provide the appropriate information to the user. Through the use of the interface devices (IMD 110, CD/I 112 and the other device 114) and the MPS 102, the switching system 108 can be controlled in such a manner that the user doesn't have to remember a telephone number to obtain the desired information. This control can be accomplished through either a digital link that is directly interfaced to the telephone switching system 108 or through an analog link where only a normal phone connection to the system. Through either of the systems an emulation of the customer actions would be undertaken.

In a typical example, a call is made by the user to order a service. The MPS 102 places call to the room through control of the system 108. The room telephone will ring and the MPS 102 will send a message to the switching system 108 that the customer would like to access a service, in this case, a restaurant where the customer would like to make reservations. It should be understood in the alternative to the above that the restaurant could be called first via the system 108 and then the MPS 102 would call the customer back. The switching system 108 will then call the restaurant, introduce the caller and then the restaurant will be linked to the room. All of these activities are done transparently to the user. Through the use of this system 100 it is also possible to print out faxes and or receipts directly at the front desk of a hotel or the like.

The system 100 is capable of transaction processing via the multimedia in a variety of ways. For example, transactions can be processed by posting billing information to a computer within the closed cable system, a facsimile ordering system within the system or through a voice order processing.

The MPS 102 will provide and receive information relating to movies and other services from and to interface devices 110, 112, and 114. The interface devices 110, 112, and 114 are in the hotel facilities connected either to the hotel video cable system through use of the video/audio outputs or connected via digital links from interface devices 110, 112 and 114 in each guest's room.

Figure 3:
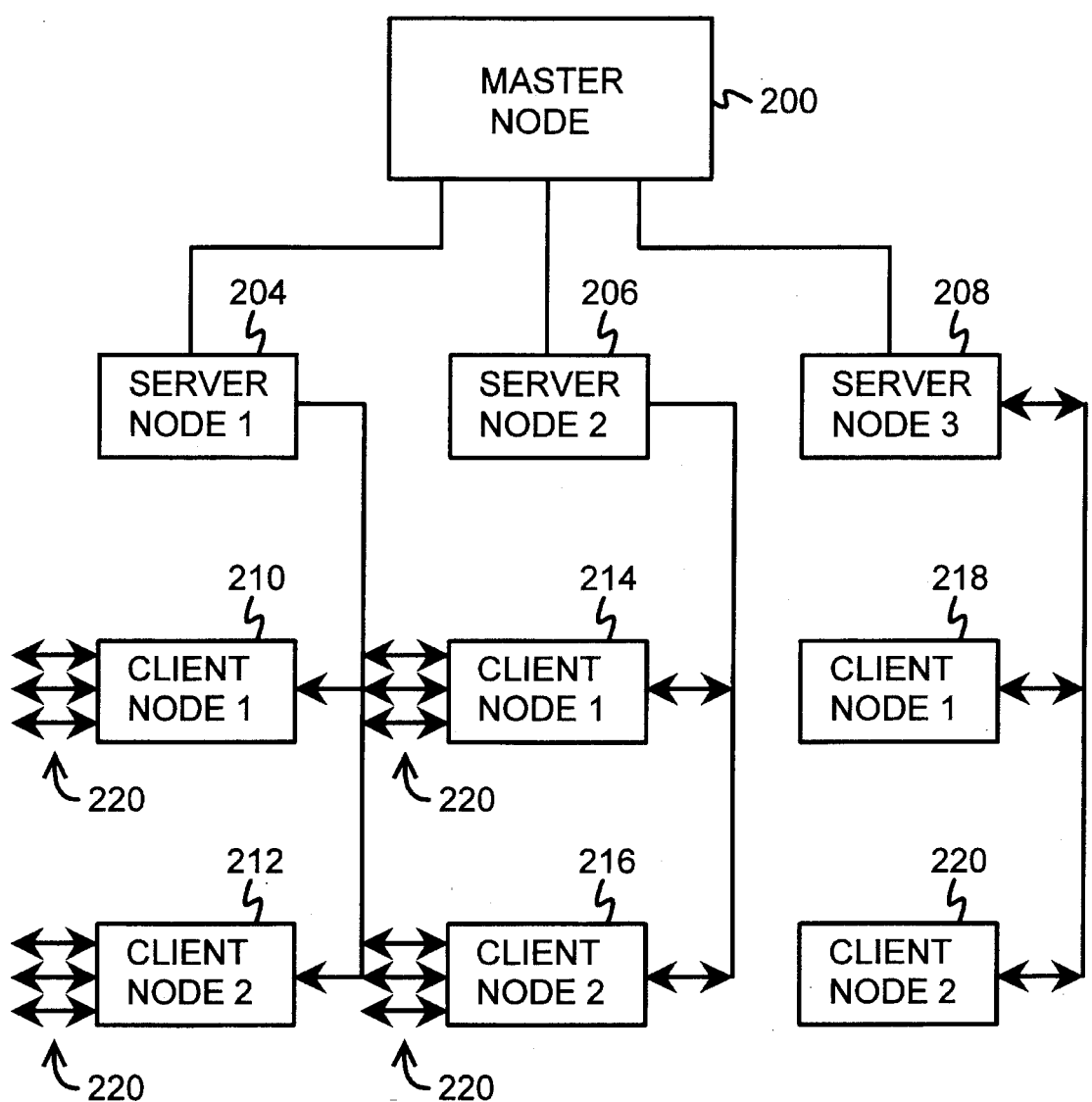
FIG. 3 is a block representation of the multimedia processing system (MPS) in accordance with the present invention.

Referring now to FIG. 3 what is shown is the preferred embodiment of a MPS 102. The MPS 102 comprises a distributed computing architecture. The distributed computing architecture includes a master node 200 that has, in this case, three server nodes 204, 206, and 208 for the IMD, CD/I and the other devices respectively. The other devices that could be coupled to MPS 102 are, for example, but not limited to video games, a CD ROM device, a personal computer, or a specialty device such as a translator or gaming device such as a video slot machine or the like.

Each of the server nodes 204, 206 and 208 have client nodes 210, 212, 214, 216, 218, and 220 connected to the respective interactive devices. Attached to each of the clients nodes 210, 212, 214,216, and 218 ports 220. When connected via the existing networks or the MPC 109 (FIG. 2a) and then on to connection to the interactive devices 110, 112, and 114 (FIG. 2) which has its own processing storage and computing structure the entire network can be operated as a massive distributed computing environment.

This environment shares all dimensions of computing, storages transmission and peripheral resources (printing, product ordering, mailing functions, etc.). This type of computing architecture would include dynamic port allocation and would include incremental failure characteristics to allow for robustness of the MPS 102.

In addition through the use of this interactive system 100 of the present invention a multiplicity of different interactive devices can be utilized and no modification to the device need be made to allow for devices' use within the system. Accordingly the link between the MPS 102 and the interactive devices can be a serial link, a CD/I link, a cable link such as ethernet or telephone connection via a simple infrared relay control link. Since the MPS 102 can transmit and receive data as well as control information it can operate utilizing a wide range and types of interactive devices such as video games, CD ROM, personal computer or specialty instruments such as translators.

Figure 4:
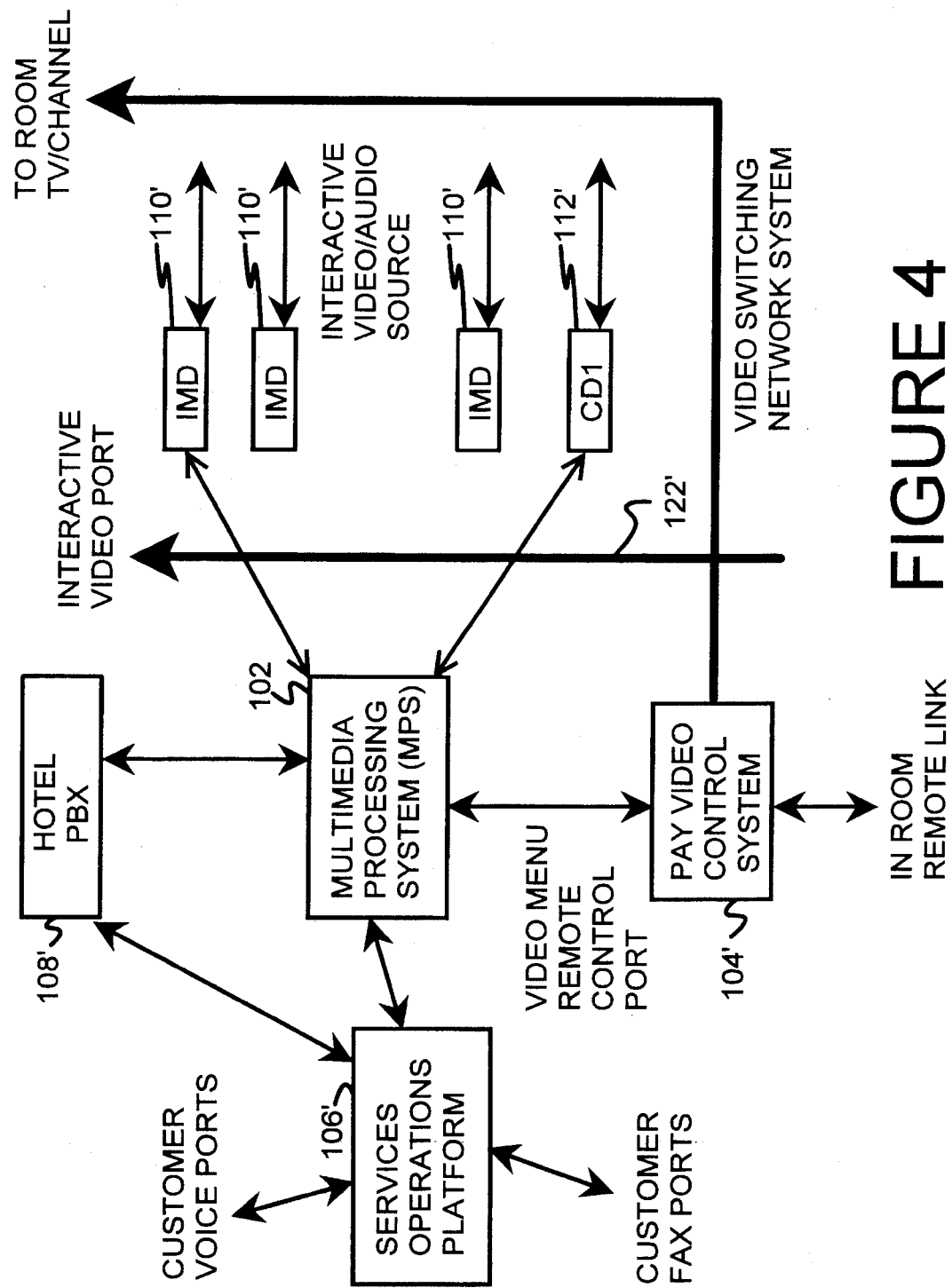
FIG. 4 is a first specific embodiment of an interactive multimedia system for use in a closed cable network.

In a first more specific embodiment shown in FIG. 4, the multimedia processing system (MPS) 102 receives program source material from the services operation platform (SOP) 106' and from a pay video control system 104'. The control system 104' can be a pay per view system such as a On-Command™ Video or a different type of service, such as a shopping, buying movie or airline tickets, or the like.

The SOP 106' is utilized for receiving facsimile and voice messages. The SOP 106' can also be utilized in conjunction with pagers and the like to relay messages. By linking the SOP 106' to MPS 102 messages can be displayed on a monitor within the guest room. In addition, faxes can be displayed on the television and could be forwarded to other locations.

The multimedia processing system 102 will provide and receive information relating to movies and other services from to interactive devices 110' and 112'. The interactive devices 110' and 112' will be located in the hotel facilities connected either to the hotel video cable system through use of the video/audio outputs or connected via digital links from interactive devices 110' and 112' in each guest's room.

Figure 5:
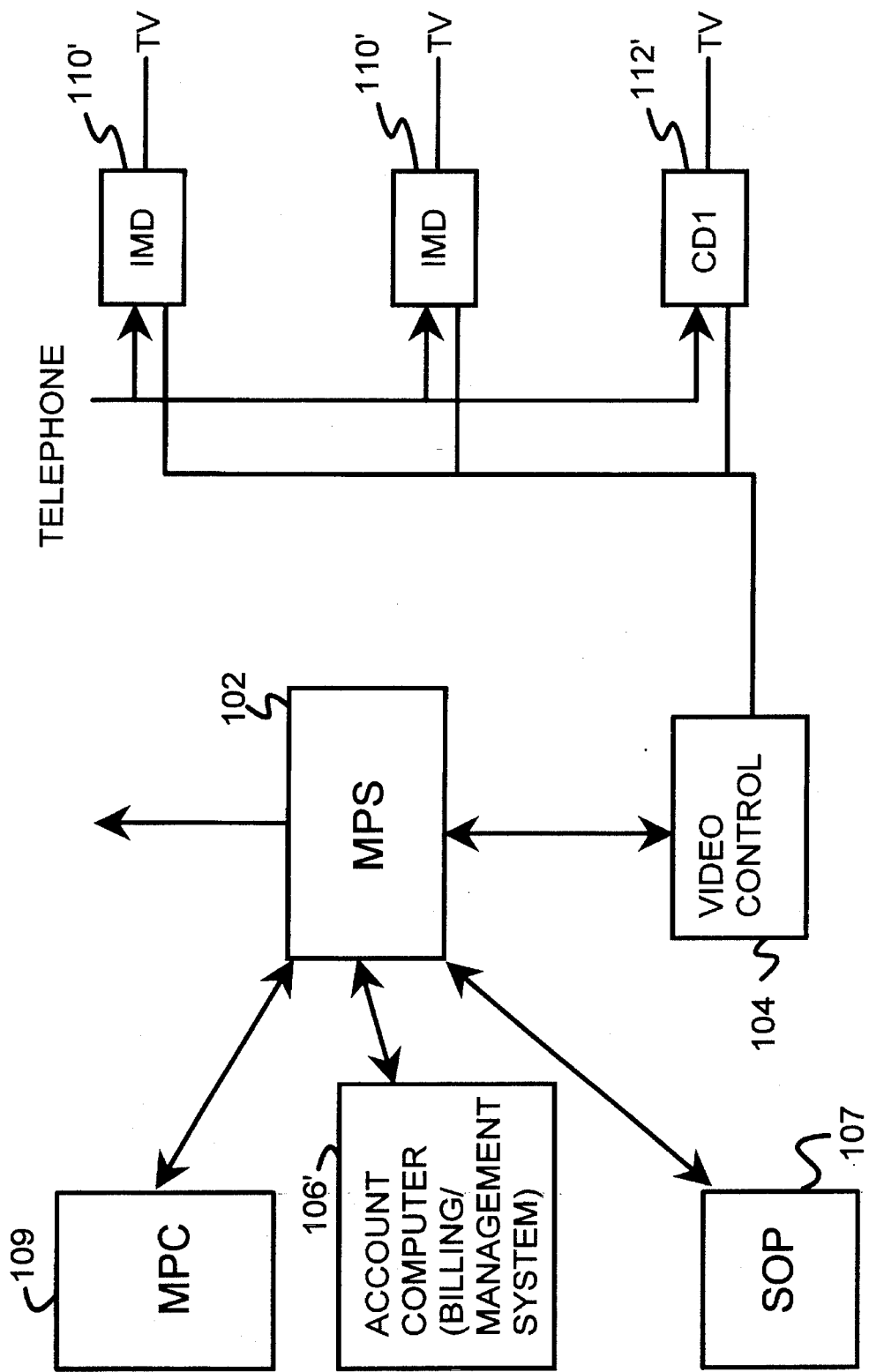
FIG. 5 is a second specific embodiment of an interactive multimedia system for use in a closed cable network.

In a second more specific embodiment shown in FIG. 5 the architecture is similar except that there is an IMD 110 in each guest room. The IMD 110 can also be used within an interactive voice response system 119 to provide a more complete interactive system. In this embodiment, the IMDs 110" can be utilized to provide the interactivity for each room. The structure of the IMDs 110" will be described in detail later in this specification.

The IMDs 110 can take on many different forms dependent upon how much intelligence is located in an IMD 110 relative to the system architecture 100. The system architecture 100 shown in different aspects in FIGS. 2–5 provides program material which will enhance the interactivity of information that is transmitted along the video network. Accordingly, what the system architecture 100 represents, in fact, is an additional network which would receive information from the program source which would also be part of the existing closed cable system. The system architecture 100 will then be utilized to provide for enhanced multimedia information through psychographic manipulations or other enhancements to the systems to provide for an improved interactive closed cable system.

Figure 6:
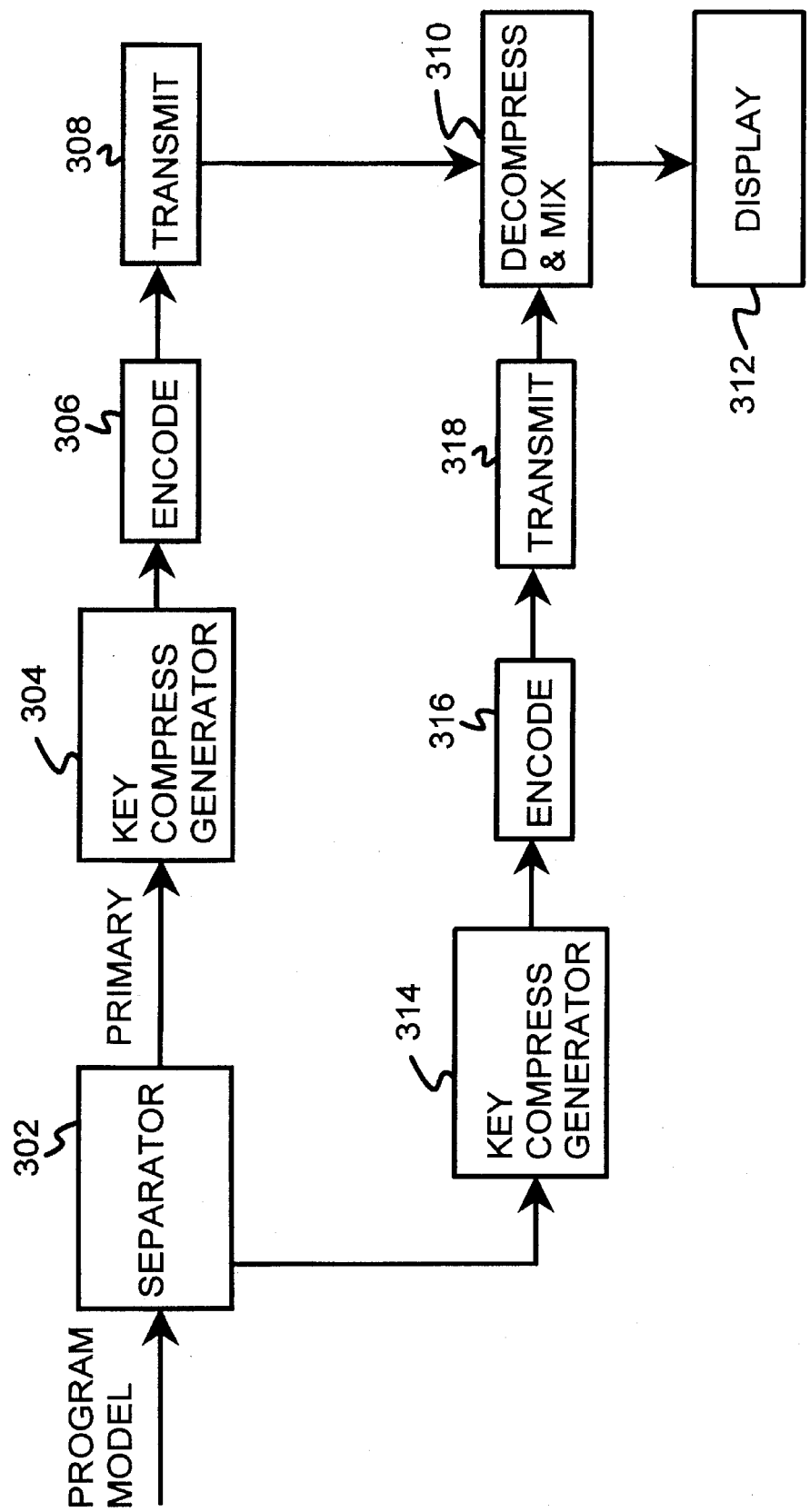
FIG. 6 is a flow chart of a first embodiment of the optimization method which is utilized in the closed cable network in accordance with the present invention.

Within each of the IMDs 110 of the system 100 is an optimization technique for enhancing the quality of the multimedia information that is present. To more specifically describe this optimization technique, refer now to FIG. 6 which is a block diagram of an optimization method in accordance with the present invention. The following paragraphs along with the accompanying figures will provide the details regarding the optimization method and how it will be used advantageously to provide an enhanced interactive multimedia system.

The purpose of the IMD 110 is to provide maximum interactivity while at the same time providing maximum retention of the program model. It is also important that there be minimum transit time for the interactivity while the information has maximum replication. Therefore, it is very important that the program model psychographic parameters be well described. For example, the spatial, color, temporal, audio response, material concept, contention perception all should be very well described and defined in the program model.

Referring again now to FIG. 6 what is shown is a first embodiment of a flow chart for providing an enhanced interactive multimedia information that utilizes the principles of the present invention. The flow chart 300 comprises the steps of providing a program model to a separator. The separator 302 will divide the information into primary and secondary layers of interactive multimedia information. The separation is automatic and can be accomplished in a variety of ways. For example, the layers can be separated by production sources. In another example, separation can be accomplished through key coding the layers. In yet a third example, the layers can be spatially separated or separated by the various colors. Finally, layers of information could be separated by a filtering process.

The primary layers are provided to the compression generation block 304. There are a variety of ways that the multimedia data can be changed or generated to use less bandwidth. For example, compression algorithms or their equivalents could be utilized to reduce the bandwidth used.

In addition generators, such as in a tone generator system, could be utilized to reduce the bandwidth required. Finally, key coding systems could be utilized to reduce bandwidth use. Such systems will be discussed in more detail later in the specification.

In this embodiment, the primary layer is provided to an encoder where the primary layer is prepared for transmission (block 308). Thereafter the primary layer of information is decompressed (block 110). The primary layer is then decoded and mixed with the secondary layer of data information (block 312) to provide an enhanced interactive multimedia image (motion, video or other) or data to a display.

Similarly, the secondary layer is compressed through block 314, encoded (block 316) and then transmitted to block 318 to decompress and mix block 310. The two signals (primary and secondary) are then sent to display 312.

In this embodiment, for example, for the optimization of video images, the primary layer can be the foreground image, the secondary layer can be a background image. Through the use of this type of optimization technique multimedia information can be enhanced while at the same time utilizing significantly less bandwidth. In addition, by optimizing both layer, s, full motion video is possible.

To more fully understand this feature refer now to the following discussion. In a typical interactive multimedia system the information is all sent along one layer. The information that can then be transmitted is limited by the bandwidth of that layer.

In the prior art, the interactive multimedia information that could be transmitted along typical networks or transmission paths that are very limited because, for example, in the case of video images the bandwidth is not adequate to provide a high quality image to a display.

Hence, in the present invention, by separating the multimedia information into primary and secondary layers and thereafter compressing the more important information utilizing well known compression algorithms, a system is described that can produce enhanced interactive multimedia information that easily be transmitted over existing networks.

Figure 7:
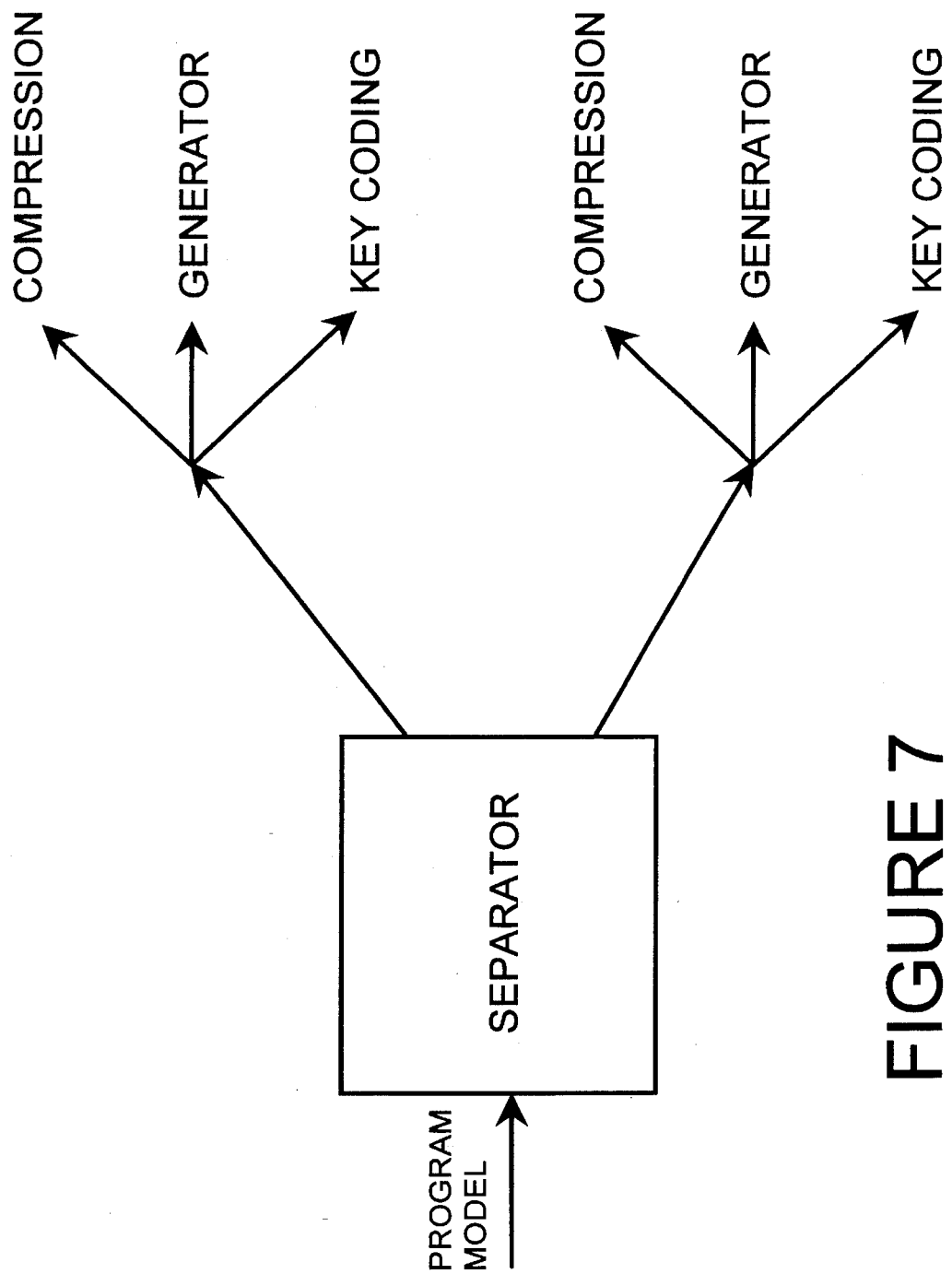
FIG. 7 is a representation of the separation of primary and secondary multimedia information.

To more fully describe the psychographic enhancement feature of the present invention refer now to FIG. 7 which shown the various possibilities from a particular program model. The program model is provided to the separator 302 of the multimedia system.

Psychographic enhancements are critical to the improvement in interactive multimedia transmission and reception enhancements in the context of the present application is information that is not transmitted but operates on, operates in conjunction with, or operates as a supplement to transmitted multimedia information. There are three separate categories that will be described that relate to psychographic enhancements.

The first category will be described as a cross correlation between the information that is being transmitted and being enhanced due to the presence of information that is not transmitted. Dithering of image is an example of this in that dithering masks artifacts of images that are present and that improves the image quality. This type of system does not remove the artifacts but actually just masks imperfections. A second example in the audio arena where secondary audio materials such as a sound of an ocean or the like which might mask problems in the audio quality of the primary sound (voice, music or the like).

The second category is where the signal is actually changed without the use of any control signal; for example, through interpolation or some other technique. The typical example of that is a graphic equalizer in which certain frequencies are enhanced depending on the range of the particular device. Another example of the second category is to frequency or amplitude compress a certain signal so as to further enhance the frequencies that are being transmitted. It is also known to use various filters to sharpen or provide certain information that will actually modify the signal without controlling it per se.

Finally, the third category is using the primary and secondary information to drive the other generators that might be present within the multimedia system. This can be utilized to either enhance the multimedia information or enhance the program model. An example of this is the use of real-time graphics frequency spectrum displays to enhance a music juke box type of program model.

As is seen in FIG. 7, the primary multimedia information layer can be compressed to reduce the bandwidth utilizing well known algorithms. It is also seen that the signal can be replaced by a generator that is responsive to the primary/secondary layers signals. Finally, a key code could be used to cause information to be provided from a look-up table or the like.

Although all of the above methods provide advantages in accordance with the present invention, key coding has some additional non-obvious advantages when utilized in the optimization system of the present invention. In the following paragraphs the use of various key coding systems will be described generally along with their attendant advantages.

Typically, when looking at an interactive multimedia information signal there are several components of that information. The first component is the data or the multimedia information itself that is being conveyed. The second component is referred to as program model dynamics. That is the changes that occur in the interactive multimedia information due to for example, a fade that allows for a transition from one scene in the graphics or video image to another. Conversely, if you want to wipe away an image there is information associated with the multimedia data that would call out for that transition to change efficiently.

Finally, the third category of interactive multimedia information is what will be referred to in this specification which will allow a particular device or system to go from one category to another. In a typical interactive multimedia information system all this information is required to adequately transmit such information.

In its simplest form, a key has an identifiable code which dictates the commands on the other side of the device. The clearest example of such a keying system would be the very simple dual tone multi-frequency (DTMF) signal. This type of signal can be used in the telecommunications area to provide keying for low bandwidth protocol. These keys would then command a code table on the side of the network to provide certain information about the multimedia information to be displayed without requiring actual transmission of the multimedia information.

A more specific version of this type of key coding is what will be referred to in this specification as control information keying. What is meant by controlled information keying is where a key code is utilized to access particular types of commands which can then be used to control other items on the other side of the network.

Such a table would then be utilized to access a certain set of multimedia information in the network. A final version of key coding will be called program branching keying is described by each of the keys representing a certain branch identification. Thus in this type of key coding the key is cross referenced to a particular branch of the interactive multimedia program where each of the branches allows plurality of functions or commands to be accessed in order to replicate the program model.

The important feature that is provided by all of these types of keying coding arrangements is that information already present on the network can be utilized. Therefore, the processing power inherent in the network or the system being accessed can be utilized rather than having to have to provide that processing power within the optimization system itself.

It is also important to develop means to improve the transmission quality of the multimedia information, for example, the information may be transmitted utilizing a typical transmission algorithm with standard communication file data transfer protocols. The interactive multimedia information could also utilize specialized protocols that are optimized for the particular interactive multimedia information that is to be transmitted. In so doing the algorithm for the compression algorithm can be interactively matrixed with the transmission algorithm to provide the highest quality information with the maximum interactivity with the minimum transmission line.

Figure 8:
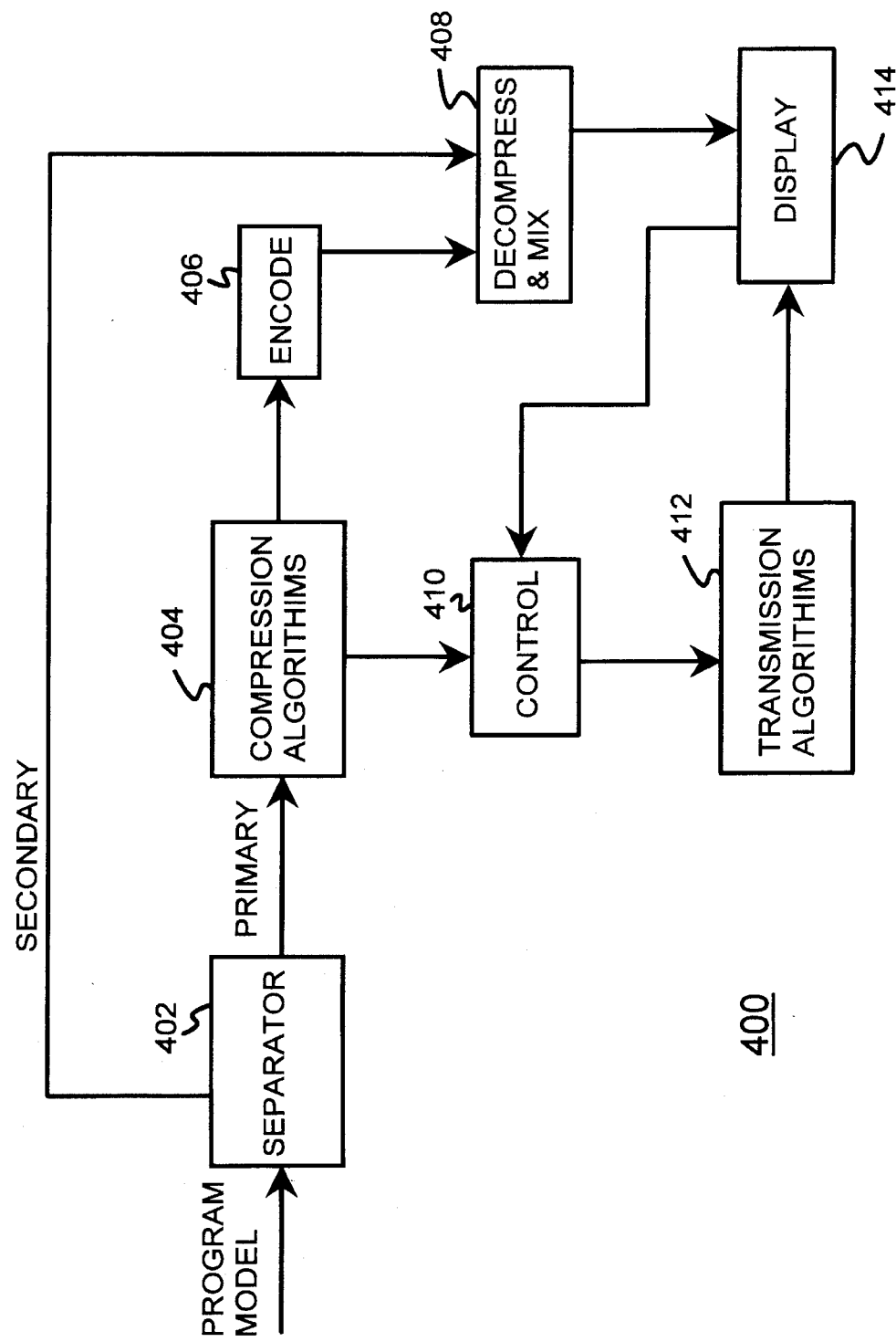
FIG. 8 is a flow chart of a second embodiment of the optimization method showing the cooperation of a compression algorithm with a transmission algorithm in accordance with the present invention.

Referring now to FIG. 8, what is shown is a flow chart that shows the cooperation of the transmission algorithm with the compression algorithm to produce a high quality multimedia image. The flow chart comprises providing a program model in which the primary and secondary layers are separated (block 402). The primary layer is compressed and encoded (blocks 404 and 406).

A control element (block 410) is utilized to control a compression matrix and a transmission matrix. These two matrices comprise a plurality of compression algorithm and transmission algorithm respectively that are interactively controlled such that as the various algorithms are detected the quality of the multimedia information and the speed of the transmission are interactively determined.

The quality of the information could be determined manually or through the use of some control circuitry. It should be understood that these same matrices could also be used on the secondary layer. It was not shown or described for purposes of clarity and simplicity.

Figure 9:
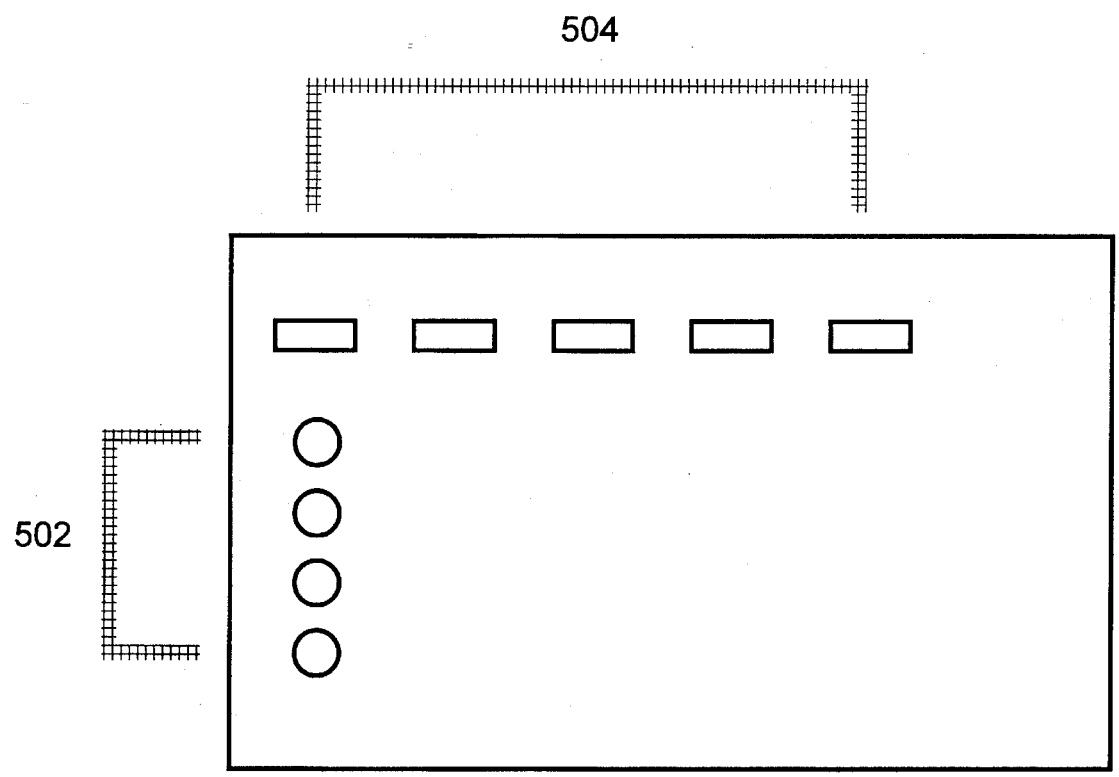
FIG. 9 is a block that shows the cooperation of a compression algorithm with a transmission algorithm in accordance with the present invention.

Referring now to FIG. 9 what is shown is a block representation of a matrix of compression algorithm with transmission algorithm that could be utilized in accordance with the present invention. The circles 502 aligned in the vertical direction are the compression algorithms. The rectangles 504 aligned in the horizontal direction are the transmission algorithms.

For example the compression algorithms could be JPEG, a generator with MIDI, and a key for a weather map background. Similarly, the transmission algorithms could be optimized for JPEG, data compression for MIDI, or DTMF for key transmission type algorithms. To provide the highest quality multimedia information while at the same time utilizing minimum bandwidth the different algorithms can be selected in an interactive manner.

Hence, a first compression algorithm could be selected along with the first transmission algorithm. The multimedia information is reviewed either for image or audio quality than a second compression algorithm is selected. The multimedia information is reviewed and if the quality is not acceptable then a second transmission algorithm is selected. The quality of the information is reviewed. This process is repeated until the highest or desired quality multimedia information and interactivity speed are provided.

The multimedia information derived from the compression/transmission algorithms can be analog or digital in nature. However, in a digital signal there are certain other features that can be taken to advantage that can be utilized in accordance with the present invention.

It is known that digital data information is typically sent in a file which specifies certain parameters of that data and the data information itself and within the data information itself is information which may not change for a certain set of files. In the case of an image file, the header information may specify the dimensions, pixel depth, and certain other features of the particular image. This file may take up a much as twenty percent of the data file.

Conversely, in a file such as MIDI music file which comprise a plurality or a series of music notes, the header may include instrument information, related information and characteristics of that particular file. In both of the above mentioned examples, the header information may not change, through the use of the optimization method the amount of information may be significantly reduced over time.

Hence, in the case of the image file, the header could be sent first with no compression or with lossless data compression as the secondary file because it will always remain the same. The data file itself can then be compressed down to its smaller size.

Another method for enhancing the psychographic parameters is to provide some form of error detection and adjustment. As has been mentioned before the detection and adjustment can be accomplished via interpolation of the error. An alternative method of error corrector is through an error correction/transmission algorithm. What is meant by this, is relating the transmission to the compression to enhance interactivity.

In this type of system before the file is sent the base file is compressed and then decompressed. This decompressed file is called an expanded compressed base file. The expanded compressed base file is then compared to the original base file and an error file is then developed (the error file being the difference between the base file and the expanded compressed base file). The error file is compressed and sent along with the compressed version of the base file down the line. These files are then combined and decompressed to provide an enhanced image.

Figure 10:
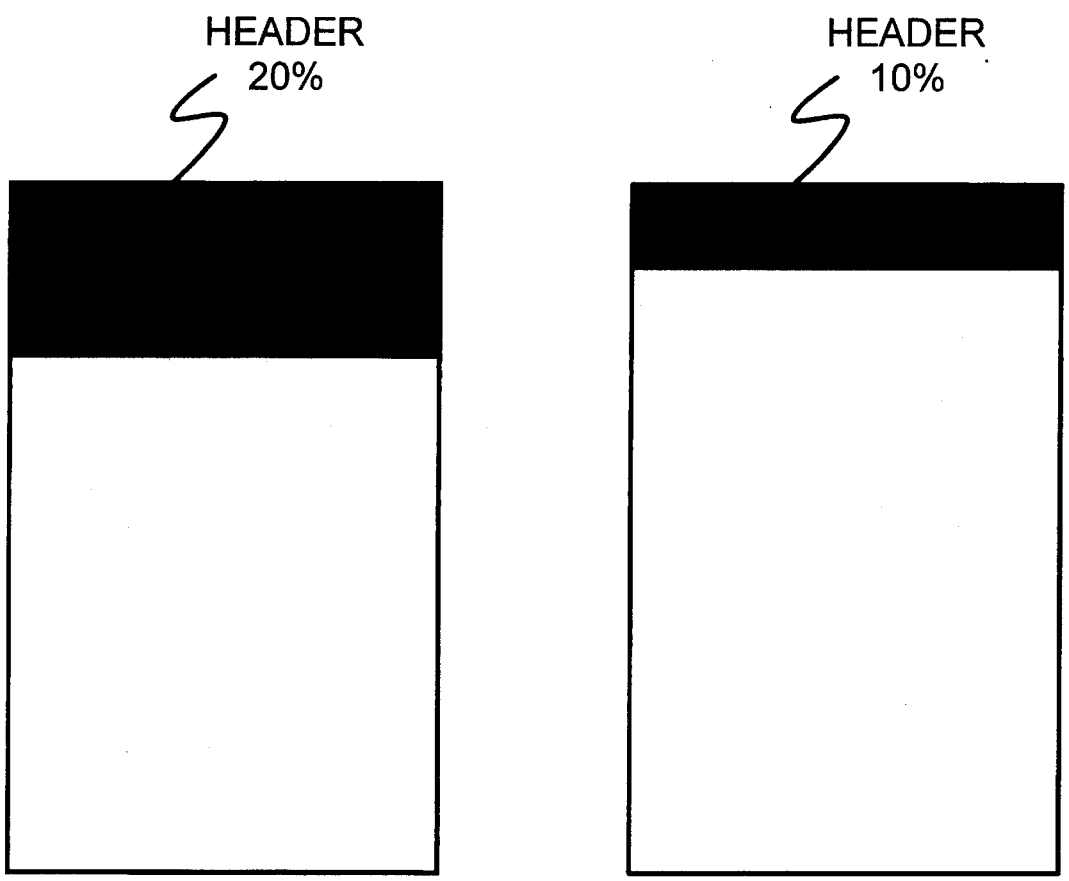
FIG. 10 is a block representation of digital information of an image file and a MIDI file.

Referring now to FIG. 10 it is seen that a data file utilizing this technique could initially be separated into primary and secondary layers. The primary layer could be compressed using a first compression algorithm, the header could be sent first along a first transmission path and the compression signal could be sent along a second transmission path.

Therefore, the amount of storage necessary for the file is significantly reduced through secondary compression techniques. This information can then be transmitted or stored across the network rather than having to have all the information stored within a particular device within the optimization system.

It should be understood by one of ordinary skill in the art will recognize that the number of algorithms is not limited to the number shown in the figures. In addition it should be recognized that the order or the selection of the algorithms could be changed and that would be within the spirit and scope of the present invention.

The present invention has been discussed in terms of compressing the primary layer or layer and by compressing and transmitting that primary layer in a particular way the interactivity of the system is enhanced. It should be understood that it may be equally important to enhance secondary layers to produce the same effect.

Therefore, it may be important to enhance the secondary layer, it may be important to enhance the primary layer or it may be important to enhance both. Therefore, the present invention through the use of compression and transmission algorithms and through the psychographic enhancement of the program model can enhance interactivity of a multimedia system.

It should also be understood that the function of the compression and transmission algorithms can also be done through other means; for example, a signal generator could be used to provide the same information. That is, a signal generator responsive to a particular layer or layer of information could be utilized to provide that information or some level of information that is representative of that layer. For example, a tone generator responsive to a signal from the secondary layer to provide the tone that would be representative of that secondary layer.

Conversely, some type of graphics generator could be utilized to respond to that same type of signal to provide a certain type of graphic image in a video system. Finally, it should also be understood that the psychographic parameters can be adjusted by human operator or in the alternative can be adjusted or modified by an automatic means.

As has been before mentioned, it also is very important in this system architecture to have an interactive multimedia device 110 which will allow for the receipt of high quality multimedia information from the system architecture. The IMDs 110 can be either located in the facility in the basement or are utilized with each of the television monitors within the hotel or hospital room to provide enhanced audio, video and graphic information within the closed cable system.

Figure 11:
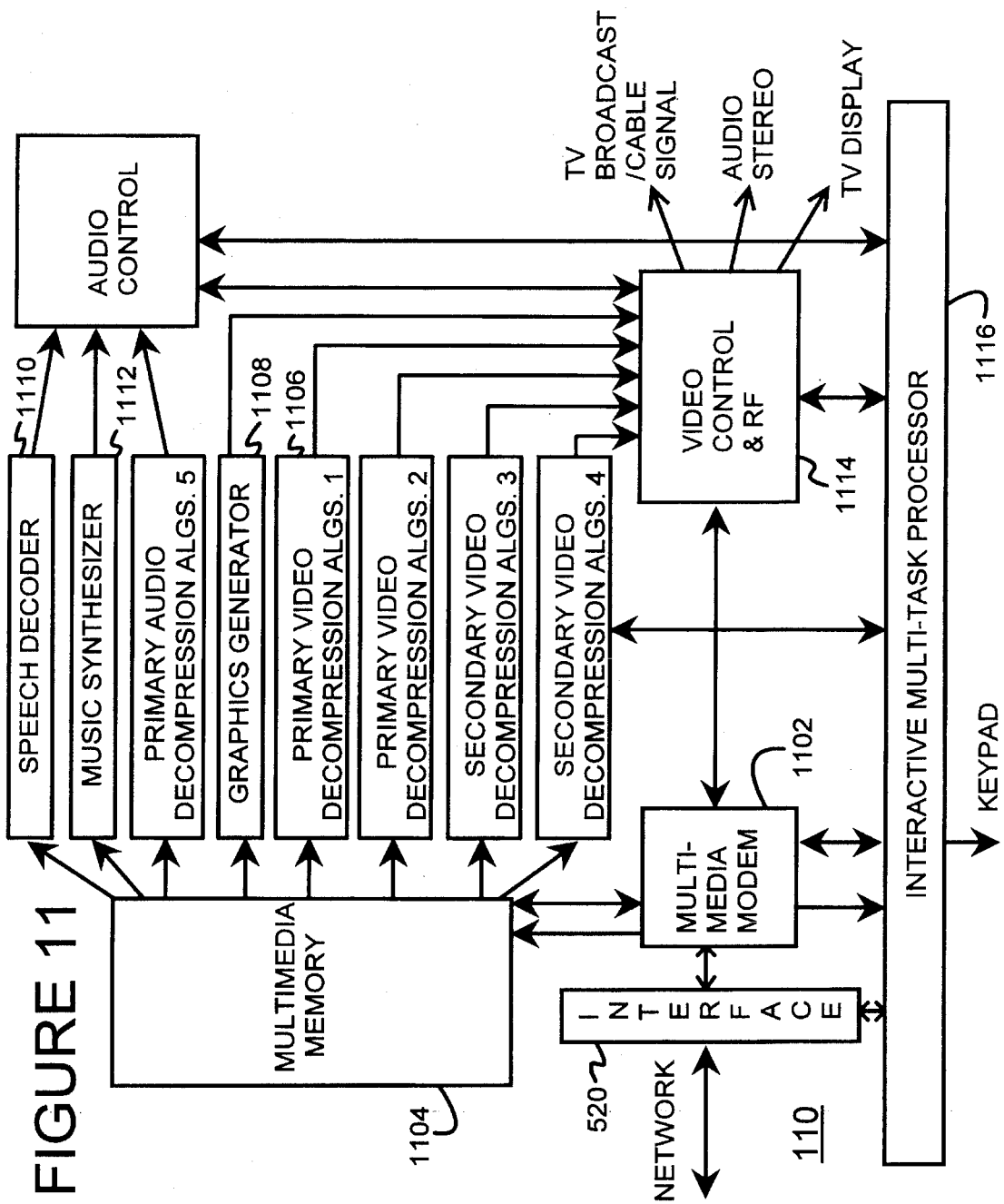
FIG. 11 is a block diagram of a general embodiment of an interactive multimedia device (IMD) in accordance with the present invention.

FIG. 11 is a preferred embodiment of an interactive multimedia decoder (IMD) 110. The IMD 110 comprises several components. The cable or telephone line is coupled to a multimedia modem 1102. The multimedia modem 1102 is coupled to a multimedia memory 1104 which can be an expandable dynamic random access memory (DRAM) 1104. The multimedia modem chip 1102 provides data to a multimedia decompressor device 1106. The multimedia memory 1104 provides data to graphics/character generator 1108, speech generator 1110 and music synthesizer 1112. In addition, the output of the generators 1108, 1110, and 1112 are provided to a video control chip 1114. Video control chip 1114 provides signals to a standard television display and receives signals from a standard television source. The multimedia modem 1102, the multimedia memory 1104, the multimedia decompressor 1106, the multimedia digital/audio control 1108, the video control chip 1114 and music synthesizer 1112 are all ultimately controlled by an interactive control interface 1116 which manages the operation of all of the above elements. The video control chip 1114 is coupled to a standard telephone keypad input or for a television remote-type device or a special IMD remote can be utilized in a variety of ways which will be discussed in detail hereinafter.

Personalized and Demographic information can be stored on the IMD 110, the MPS, or the PMS including age, sex of the user alone with technical information (IMD serial no, generators available). Therefore, upon connecting to the MPS 102, the IMD 110, or PMS can both forward this stored information either at the beginning of the session or anytime afterwards. This information can then be updated through the MPS 102 or directly at the IMD 110 through selection using the keypad or remote or by receiving the data from the MPS 102.

Accordingly this information provides the basis for highly accurate market research and commercial monitoring. Through the IMDs and MPS real time information can be provided to the supplier of the information. This information can also be utilized to provide interactive advertising based on the choice of the advertiser as well as the demographics of the viewer. The type of information that could be useful for example would be the logging of each key stroke made on a remote control thereby monitoring the "browsing" or viewing habits of the customer in response to either interactive material supplied by the IMD or synchronized material from the cable head-end 122.

In the case of room shopping, a guest can select information for presentation and then can choose items and then bill items to the room. As an alternative, the MPS 102 can allow for the use of a credit card to forward information on to an automated order system or to an operator. In addition, this type of system could allow for a facsimile receipt to be sent back to guest via the television monitor within the room.

Another mode of operation is the delivery of multimedia information during the period that the communication network is not in use. In this way large amounts of multimedia information can be efficiently transmitted and stored in the IMD for later review and enhanced interactivity.

The function of each of the different components in a preferred embodiment is described in a summary fashion below.

Multimedia Modem 1102

A. Responsible for all communications between cable or phone line, optional serial port, interface to multimedia memory, multimedia decode, audio control, and processor control modules.

B. Supports standards protocol for half-duplex, full duplex, and half-duplex high speed operation.

C. On-chip encode/decode capability, D/A, A/D for voice, facsimile, and data functions.

D. Dual tone multi-frequency (DTMF) detect and generation.

E. Auto-detect voice/facsimile/data switch for transparent mode transition.

F. Incorporates controller unit with binary file transfer, facsimile, data, and voice modes, and optional proprietary multimedia processor control optimized protocol firmware.

G. Firmware allows IMD to use multimedia modem to perform call processing function including telephone call dialing and connection, unattended receipt of data and fax among other functions.

H. Include ability to decode data from video cable signal including VBI encoded data or data encoded in the video signal itself outside the VBI.

Multimedia Memory 1104

A. Nominal DRAM or VRAM for image mixing/processing, and auxiliary multimedia data store.

B. Nominal ROM for resident IMD control program.

C. Optional co-resident DRAM for multimedia data store and program/data store.

D. Optional non-volatile storage (extendible).

E. Memory control unit for VRAM/ROM/DRAM and non-volatile storage.

Multimedia Decode 1106

A. Responsible for real-time decompression of images transferred to or stored in the IMD 110.
B. On chip inverse discrete cosine transform processor.
C. Reverse quantizer decoder/tables.
D. Built-in zoom, pan, chroma key, mix from compressed data incorporates interfaces to video data bus, multimedia memory, multimedia modem, video control, and microprocessor control sections.

Video Control 1114

A. Responsible for all IMD 110 video mixing, enhancements, and display functions.
B. Pixel processor for mix, zoom, pan, chroma key, transform on pixel data, transitions.
C. Graphics processor for figures (e.g., rectangles with color fill) generation, sprites, text with foreign characters, and scrolling.
D. Digital to analog conversion, analog to NTSC, NTSC video plus stereo audio to RF.

Graphics/Character, Speech Generator, Music Synthesizer 1108, 1110, and 1112

A. Responsible for enhancing received analog/digital audio, music synthesis generation, and overall analog mixing and audio effects.
B. Incorporates decoding burden.
C. Sampled instrument synthesis from compressed MIDI input.
D. Built-in micro-controller for multi-task generation.
E. Dual analog source mix, digital audio and synthesizer mix, analog audio control (volume, bass, treble, balance) for output to analog left/right audio.

Interactive Multi-Task Processor 1116

A. Responsible for multi-task execution of resident and downloaded IMD code for operation in conjunction or independently of the MCPS.
B. Master/slave microcontroller architecture for multitask control of communications, multimedia memory, multimedia decode, digital video control, digital audio/synthesis, and interface management.

In a preferred embodiment, the IMD 110 will be utilized with a television monitor to transmit and receive multimedia information. Hence, the IMD 110 can be utilized in the case of movie for access and to transmit an almost unlimited number of movies to a particular user. Therefore through the use of the IMDs in the system a more fully interactive system is possible. In addition, through this system a variety of other services can be provided for the user such as advertisements, shopping, airline ticketing, entertainment and the like.

Figure 12:
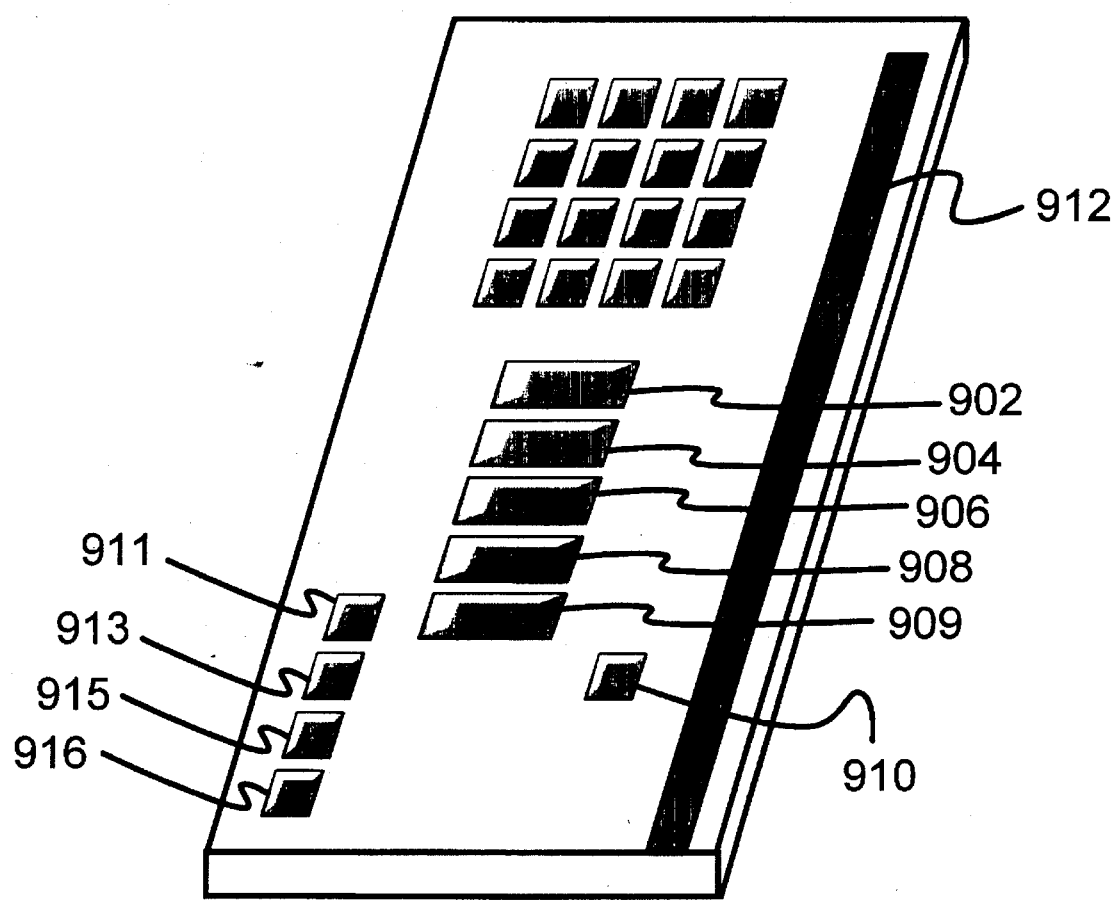
FIG. 12 is a representation of a remote control utilized in conjunction with the system architecture of the present invention.

Another critical feature of the IMD 110 is to have a remote control that will work in conjunction with the television or other display to provide enhanced multimedia information. To more fully explain this feature refer now to FIG. 12. The remote control 900 looks much like a telephone keypad. It has the numerals (0–9) and symbols (*–#) that are part of an ordinary telephone keypad. It includes an enter key 902 that is typically utilized to change information or change channels in the case of a television set. The control 900 would also include a volume key 904 and a channel or memory select key 906, a connect key 908, a telephone call key 909 and a multimedia toggle button 910. The telephone call key 909 is utilized to place a call to a designated telephone number or to a number associated with the multimedia information being viewed. The remote control 900 also includes a keys 911, 913, 915 that will control the fast forward, reverse, and slow motion of a video device.

The remote control 900 could also include a credit card slot 912. This credit card slot 912 would be utilized by the viewer to allow for the purchase of certain items directly while viewing the television screen. The credit card slot 912 could also be utilized as an indicator that a certain room is being occupied by a particular person. This indication would preclude the need for a separate inputting of the relevant user information for billing information. The credit card information could also be accessed by a credit card slide that is physically connected to the television by passing the information through the remote control cable back channel.

Finally, the control 900 includes special effect keys 916, for example, for allowing for the browsing of a multimedia directory while simultaneously displaying a picture in the picture of the current broadcast TV channel. The remote control 900 can operate in an emulated keystroke mode in which pressing one key may be utilized to emulate a combination of keystrokes. In addition a call button may be provided which would allow for sending valid numbers to another location. The remote control 900 also has the capability of emulating other remote controls. For example, through the MPS different types of signals can be mapped with the remote control. The MPS provides the translation of the signals of a CD/I device for example.

The remote control 900 could utilize a radio frequency signal or audio signal to interact with the receiver and/or IMD 110 for the control of the IMD 110, control the selection of multimedia information, and for the control of other devices. It is also known that a more conventional remote control could be utilized such as one that controls a VCR or a television and its use would be within the spirit and scope of the present invention. The remote control 900 also includes a positioning function. Accordingly, a motion detector or the like can be utilized within the remote to allow for pointing the remote at the television monitor to transmit certain information.

Another feature of the above-identified system architecture is that the program information can be linked to the network to provide for enhanced interactivity and program quality. For example, the program source can follow or be synchronized with the cable or broadcast feed to provide for enhanced distribution of program information. One specific example of this to take a new program, like CNN broadcasting, which consists of several short news items. For each news there could be stored large archives or program material related to a particular story. Hence, through multimedia interaction with, for example, the remote control 900 the stored program material can be accessed. This would allow the user to review the material in whatever detail was desired.

Another example, is in an advertising feed if a particular item was advertised, there would be the ability to refer to more detailed information about the product.

Yet another example of such a system is to have one service linked to another. An advertisement could be linked to a means for ordering the particular product being advertised including the placement of a phone call by the IMDs to the desired telephone number. In so doing, the linked system allows for additional services to be accessed.

The important requirements for this linked feature is that there is a knowledge of the contents of the system program requirements and there is a knowledge of where the user is in the program. For example, an IMD could be used for channel program identification in which the telephone call is linked to a particular channel that has been selected. Another example is link demographics for targeted interactive advertising. Hence, in an advertisement for a diaper, for example, there would be the facility to access advertisements for related items such as baby powder, baby oil or the like through the use of this linked approach.

Figure 13:
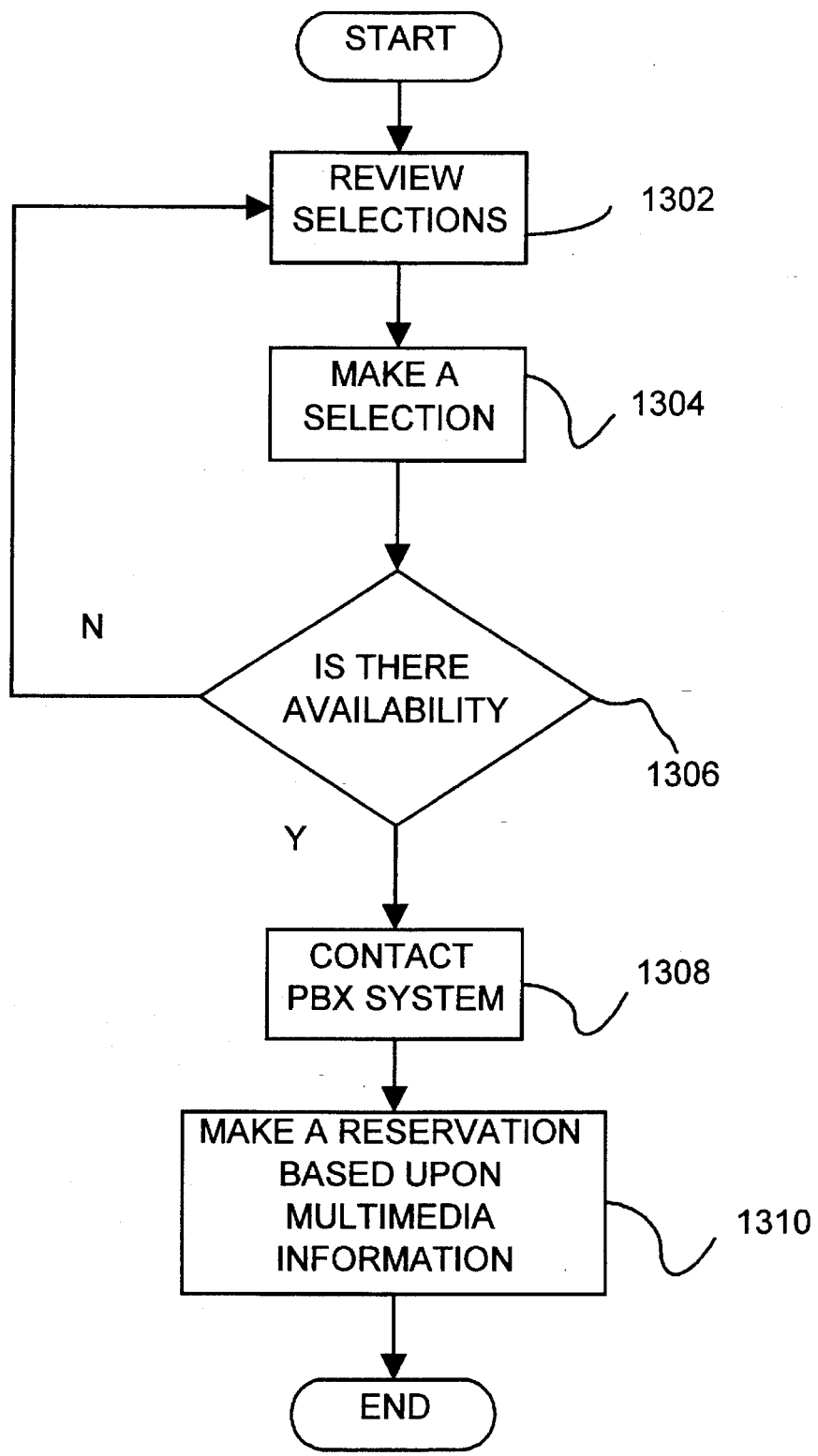
FIG. 13 is a flow chart of a reservation system that utilizes the interactive system in accordance with the present invention.

A first example of this feature is a reservation system. Referring to FIG. 13 which is a flow chart of such a system is selections can be reviewed via step 1302, then the customer can make a selection via step 1304 by reviewing the multimedia information on the television. If the selection is not available via step 1306 then the user can review selections and make another choice. However if the selection is available then the telephone system within the hotel is contacted by the MPS 102 via step 1308 so that the reservation can be made. Thereafter the reservation is made via step 1310.

An example of this could be the linking of an interactive voice response system to a multimedia system. For example, this system could be linked to a "900" number for the Wall Street Journal stock information. Thereafter, credit card verification can be entered by hand and/or by a credit card slot on the phone or the remote. More information could then be displayed, such as stock price graphs, on the TV synchronized with the latest news and price for the particular stock. Finally, system could allow for a voice annotated facsimile that could be printed at the front desk of a hotel or the like.

Figure 14:
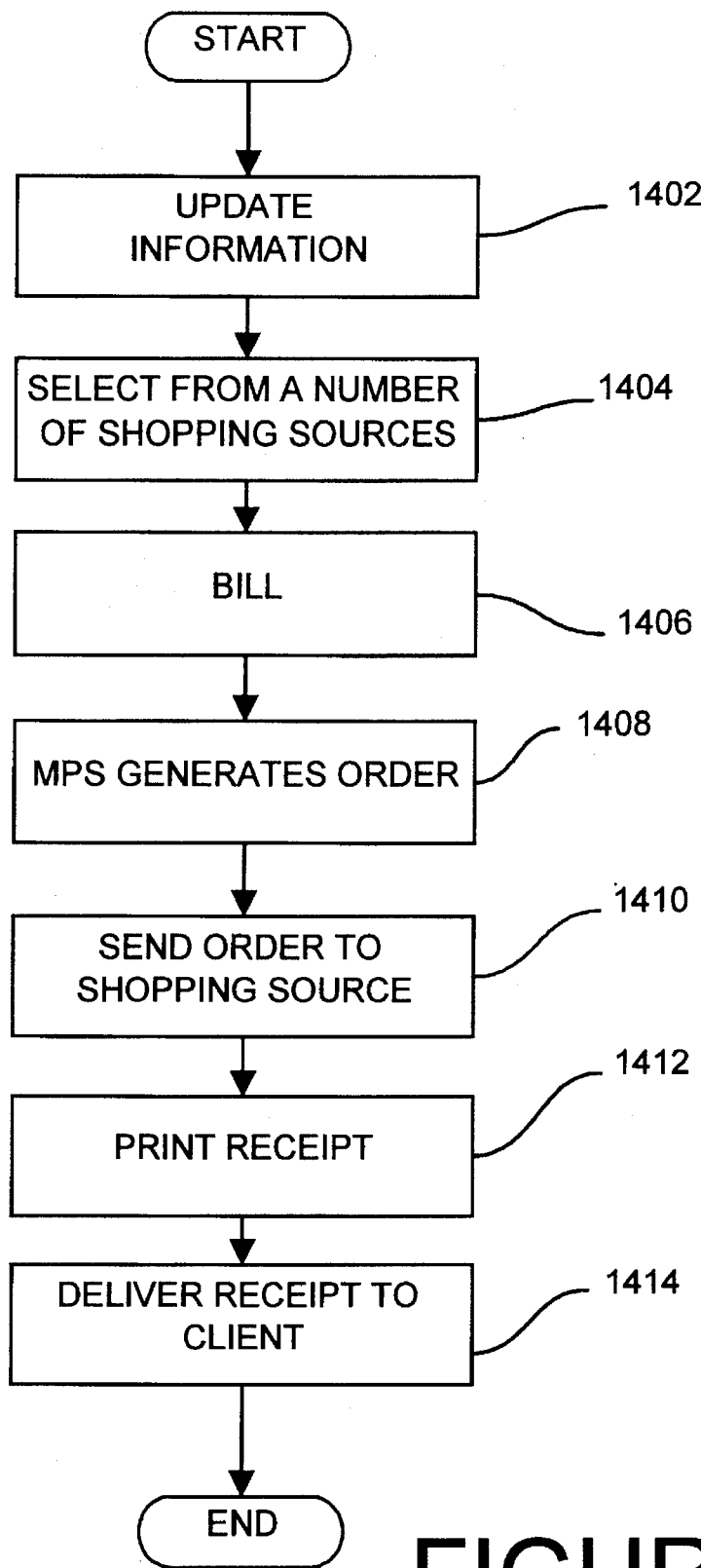
FIG. 14 is a flow chart of a shopping system that utilizes the interactive system in accordance with the present invention.

Another example of the use of this system is illustrated by catalog shopping. Referring now to FIG. 14 in such a system there is updatable multimedia information that is viewed by a customer via step 1402 on the television monitor. Thereafter the customer can select from a number of shopping sources via step 1404. Whether the interactive devices are in a central location or in a each room the customer can order by the device interacting with a catalog order desk located in the facility which then bills the customer via step 1406. The billing can occur directly through the account computer of the facility or on the other hand can charged through a credit card transaction. That transaction can be completed step via the credit card slot on the remote control 900, a credit card slot that may be located on the monitor or interactive device or telephone or finally the numbers on the credit card could be entered utilizing a remote control or the like. The MPS 102 can then generate a mail order facsimile directly to cataloger facsimile telephone line via step 1408. The MPS 102 then sends the order to the source via step 1410.

A customer receipt can then be printed at the front desk through a special printer and then the goods can then be delivered via steps 1412 and 1414. The goods could be delivered either to the hotel facilities, to the customers home or to her place of business. Finally, there could be variety of methods of delivery and there use would be within the spirit and scope of the present invention.

Accordingly, this system can be utilized effectively in a voice response system. Through the present invention a voice response can activate or operate in conjunction with a multimedia program to provide a fully interactive communication system. For example a facsimile message can be displayed on a television screen based on the voice response system.

Figure 14A:
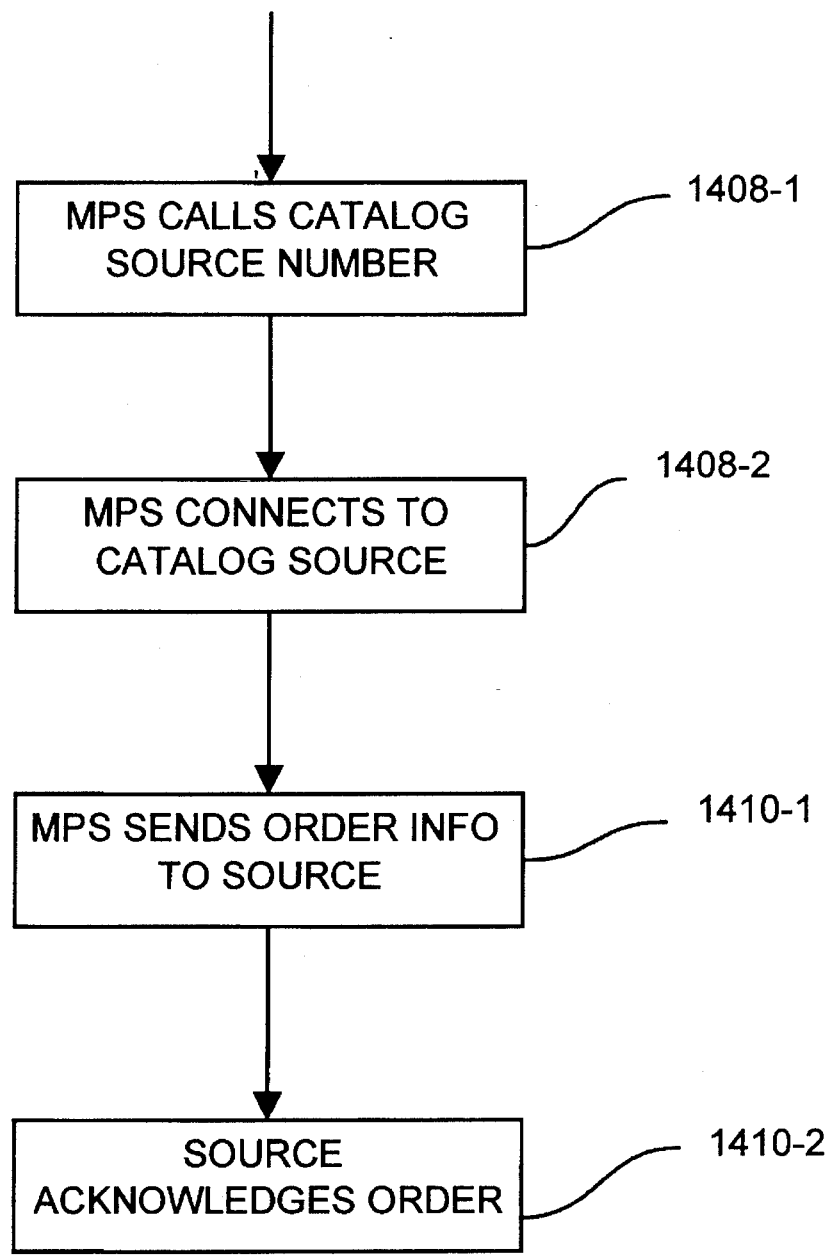
FIG. 14a is a flow chart of a portion of the shopping system of FIG. 14.

Referring now to FIG. 14a what is shown is an automated call processing system of FIG. 14. In this embodiment the system places a call to the telephone number of the catalog source via step 1408-1, then the MPS 102 connects to the catalog source via step 1408-2 and send, an automated message such as "You have reached the cable network for ABC hotel, press 1 to confirm." After the connection is confirmed the MPS 102 it will then send order information to the catalog source via step 1410-1. The source will then acknowledge the order via step 1410-2. The source could for example confirm credit card information and the like during this step.

Figure 15:
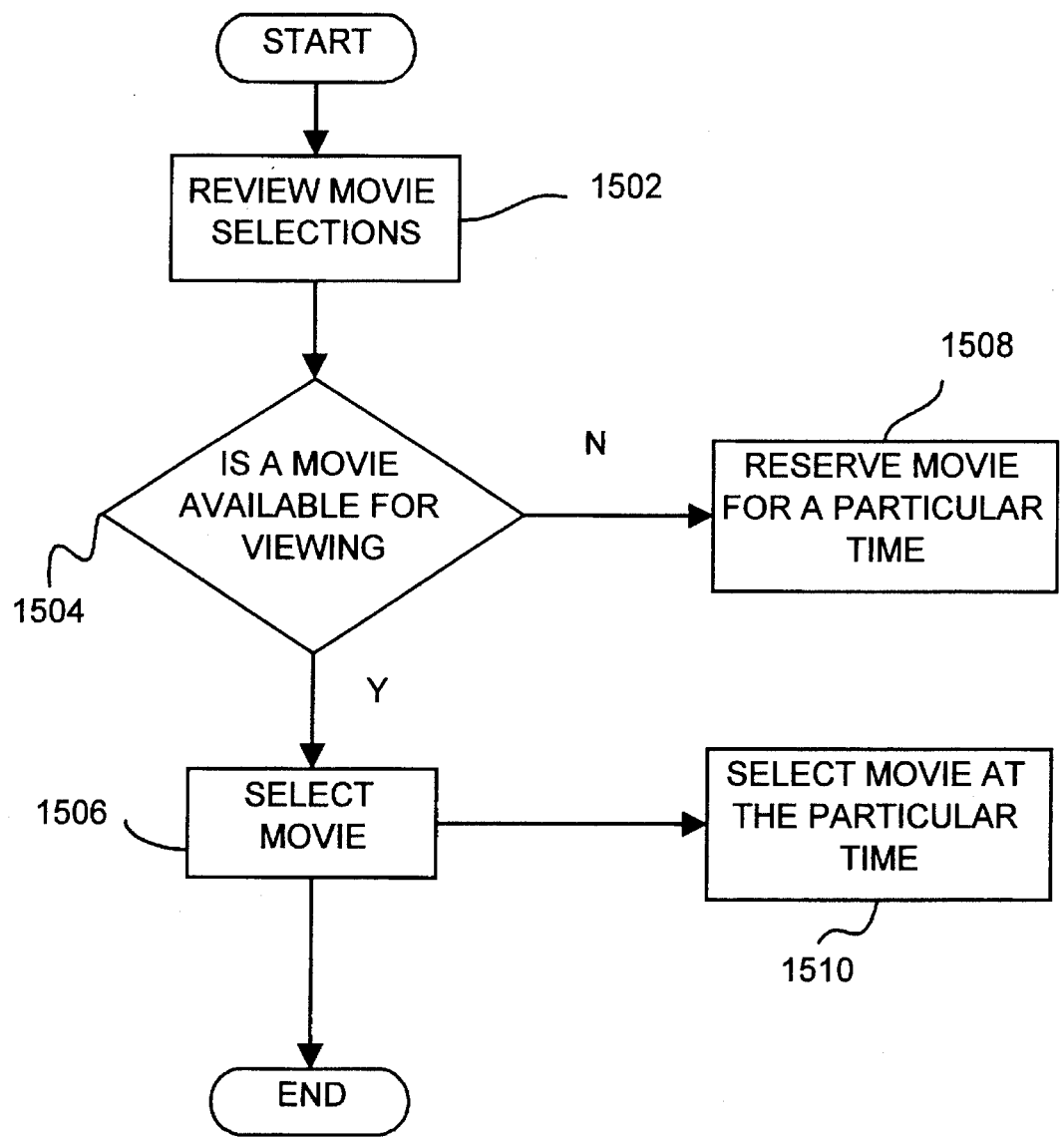
FIG. 15 is a flow chart of a movie review and ordering system that utilizes the interactive system in accordance with the present invention.

Another example of the utility of the present invention is its use in a video reservation system within a hotel system or the like as shown in FIG. 15. Through this system even those movies being viewed can be reviewed via step 1502. The customer can also determine when the video will be available via step 1504. The customer can the reserve the movie at a later time based upon the reviewed information via steps 1508 and 1510.

Figure 15A:
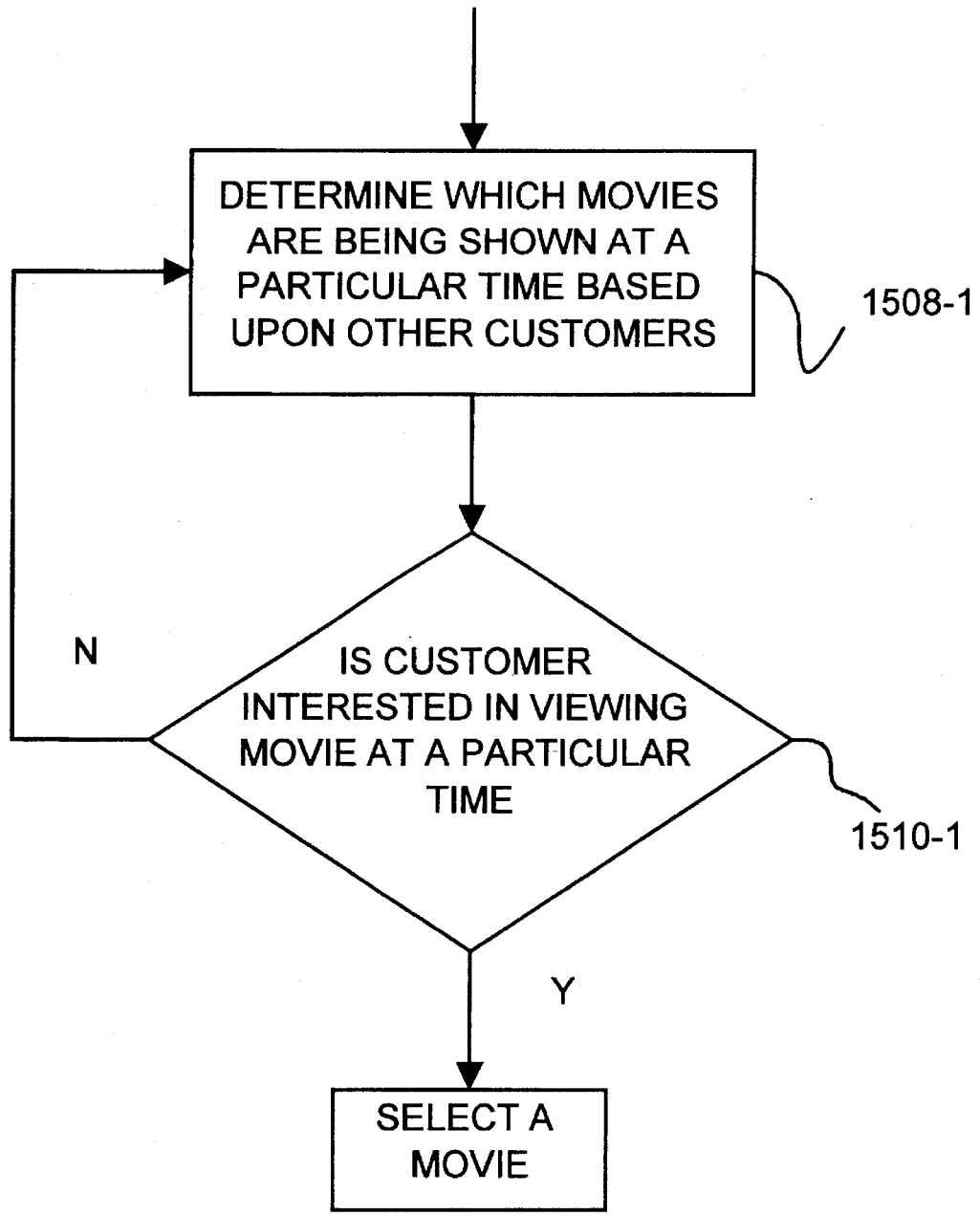
FIG. 15a is a flow chart of a portion of the movie review and ordering system of FIG. 15.

A variation on this type of system is illustrated in FIG. 15a which is an allocated movie selection system. In this system movies could be viewed within a certain margin of time such as within 15 minutes after the hour step 1508-1. If the customer does want to see the movie, step 1510-1 then the movie is selected to be seen at the allocated time, if not the other choices can be viewed step 1508-1.

Figure 16:
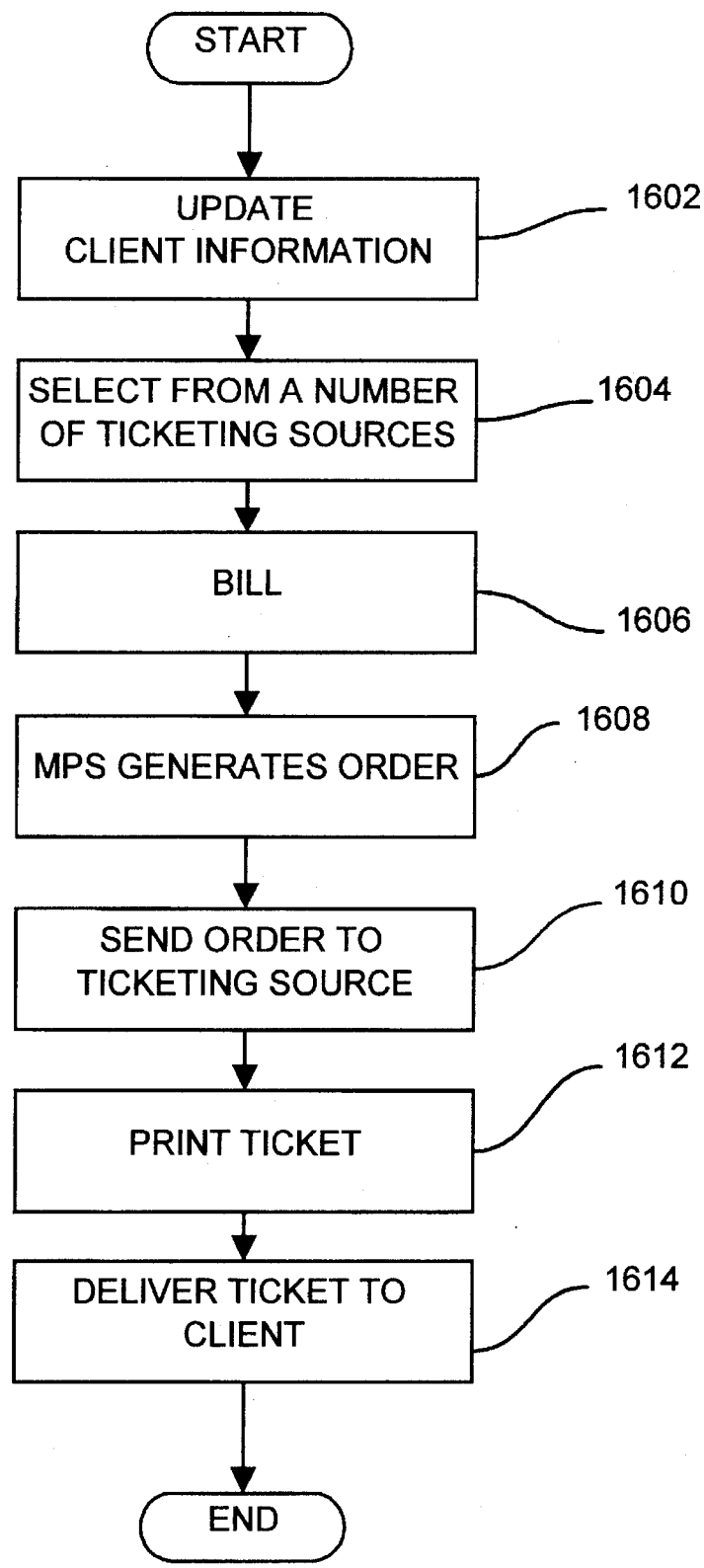
FIG. 16 is a flow chart of a ticketing system that utilizes the interactive system in accordance with the present invention.
Figure 17:
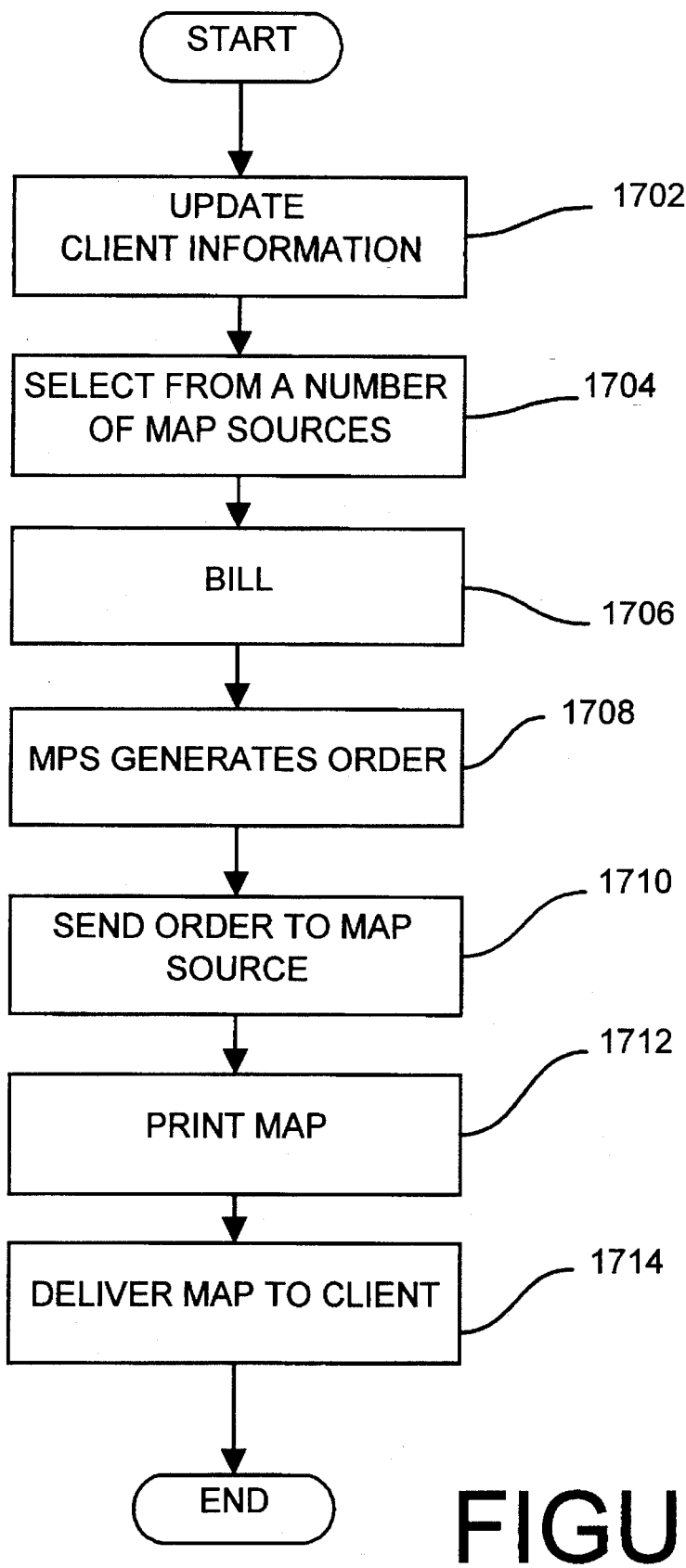
FIG. 17 is a flow chart of a map generating system that utilizes the interactive system in accordance with the present invention.

FIGS. 16 and 17 show flow charts wherein the system can be utilized to print tickets and maps respectively.

Referring now to FIG. 16 in a ticket printing system there is updatable multimedia information that is viewed by a customer via step 1602 on the television monitor. Thereafter the customer can select from a number of ticketing sources via step 1604. Whether the interactive devices are in a central location or in a each room the customer can order by the device interacting with a catalog order desk located in the facility which then bills the customer via step 1606. The billing can occur directly through the account computer of the facility or on the other hand can charged through a credit card transaction.

That transaction can be completed step via the credit card slot on the remote control 900, a credit card slot that may be located on the monitor or interactive device or telephone or finally the numbers on the credit card could be entered utilizing a remote control or the like. The MPS 102 can then generate a mail order facsimile directly to cataloger facsimile telephone line via step 1608. The MPS 102 then sends the order to the source via step 1610.

A customer receipt can then be printed at the front desk through a special printer and then the tickets can then be delivered via steps 1612 and 1614. The tickets could be delivered either to the hotel facilities, to the customers home or to her place of business. Finally, there could be variety of methods of delivery and there use would be within the spirit and scope of the present invention.

This system would have particular utility in conjunction with multimedia yellow pages. Hence, the customer can review through advertising typical vendor information as found in the yellow pages except now this information is reviewed from a television. Selections can be made using the remote control 900 to obtain certain information and thereby causing several related actions to occur. By placement of the telephone call a vendor could issue a ticket or coupon for a product or a service. An important feature for the printing of documents is the need for an inventory control system in which the customer can gain access to information that pertains to her transactions.

Referring now to FIG. 17 in a map printing system there is updatable multimedia information that is viewed by a customer via step 1702 on the television monitor. Thereafter the customer can select from a number of mapping sources via step 1704. Whether the interactive devices are in a central location or in a each room the customer can order by the device interacting with a catalog order desk located in the facility which then bills the customer via step 1706. The billing can occur directly through the account computer of the facility or on the other hand can charged through a credit card transaction.

That transaction can be completed step via the credit card slot on the remote control 900, a credit card slot that may be located on the monitor or interactive device or finally the numbers on the credit card could be entered utilizing a remote control or the like. The MPS 102 can then generate a mail order facsimile directly to cataloger facsimile telephone line via step 1708. The MPS 102 then sends the order to the source via step 1710.

A customer receipt can then be printed at the front desk through a special printer and then the maps can then be delivered via steps 1712 and 1714. The maps could be delivered either to the hotel facilities, to the customers home or to her place of business. Finally, there could be variety of methods of delivery and there use would be within the spirit and scope of the present invention.

Figure 18A:
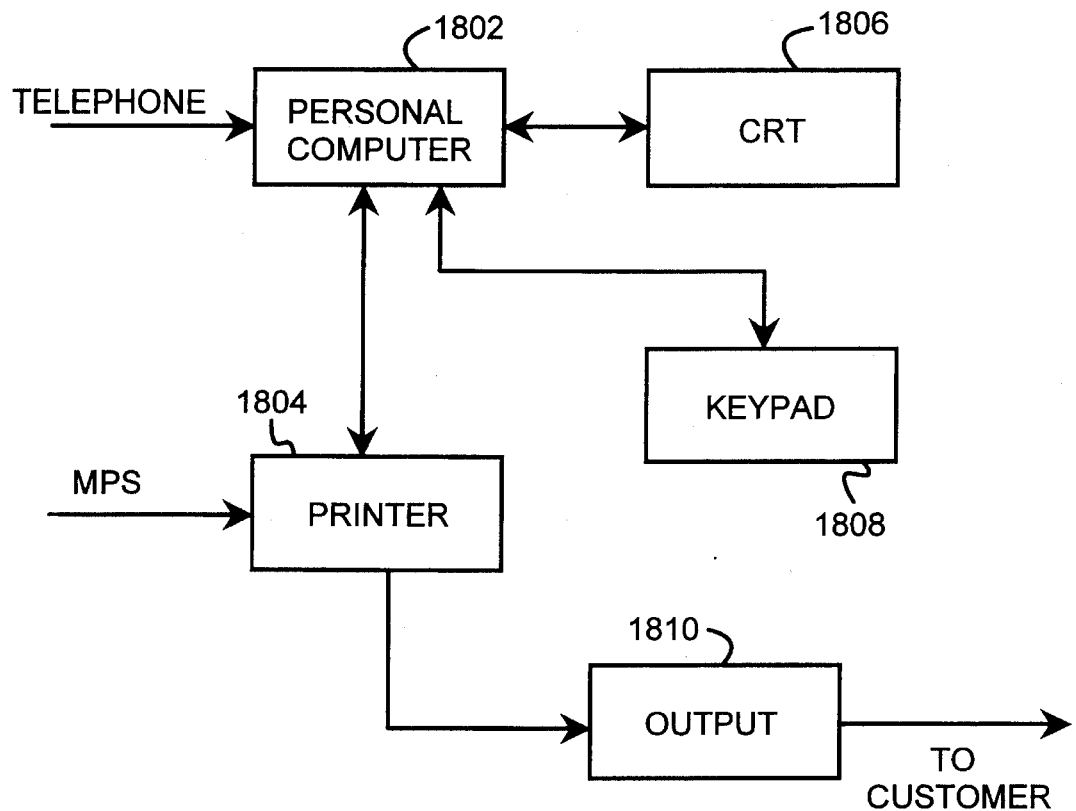
FIG. 18a is a block diagram of an electronic inventory control system utilized in the interactive system in accordance with the present invention.
Figure 18B:
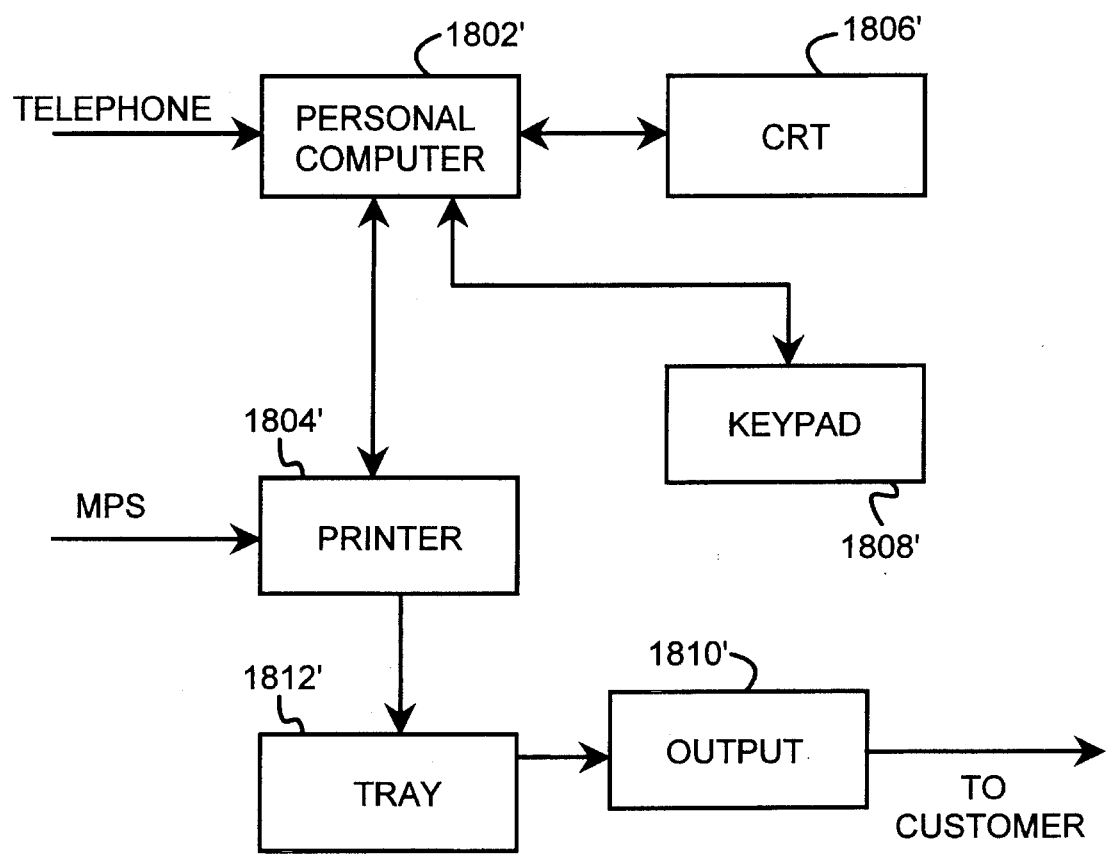
FIG. 18b is a block diagram of a physical inventory control system utilized in the interactive system in accordance with the present invention.

Referring now to FIGS. 18*a* and 18*b* what are shown is an electronic inventory control system 1800 and a physical inventory control system 1800'. Referring first to FIG. 18*a* the electronic control system includes a personal computer 1802 with an associated display in this case a CRT display 1806. Also coupled to the personal computer is a keypad 1808 and a printer 1804. The printer in turn is coupled to an output device 1810. In such a system the keypad 1808 can be utilized by the customer in much the same way as an automatic teller machine (ATM) in which the customer has a security code through the use of a room key to allow the customer to order tickets or make reservations via the personal computer 1802. The computer is linked to the MPS 102 to allow for secure access to the various sources of information. The display 1806 can be utilized to interactively operate with the personal computer to cause the printing out of the appropriate transactions via the printer 1804. The printer 1804, typically a laser printer or specialized ticket printing machine prints the information and provides that printed information or ticket to a secure output device 1810.

FIG. 18*b* has similar elements to FIG. 18*a*, however the physical system includes a tray for receiving the transactional information. Therefore each customer can have access to an individual tray of information by using their hotel key or the like. Through the inventory control systems shown in FIGS. 18*a* and 18*b* the customer has secure access to interactive multimedia transactions.

In yet a final example, the system can be configured for play along games. Accordingly, an interactive game could be provided which would allow for an individual to play a game such as chess, with another guest in the hotel or against a machine as in the case of a video game.

It should be understood that the IMD 110 itself could be utilized as a call processing system. Finally, it should be understood that there could be multiple MPS 102 to provide for very large scale call processing through the MPC 109.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

What is claimed is:

1. An interactive system for a closed cable network comprising:

means for processing multimedia information;

means coupled to the multimedia processing means for receiving telephone messages from and transmitting telephone messages to the multimedia processing means;

means coupled to the mutimedia processing means for receiving account information from and transmitting account information to the multimedia processing means;

means coupled to the multimedia processing means for receiving control information from and transmitting control information to the multimedia processing means;

a plurality of multimedia devices coupled to the multimedia processing means to provide updatable multimedia information and;

multiplexer means coupled to an Interactive Multimedia Decoder (IMD), the multiplexer means for receiving inputs from the plurality of multimedia devices and for selecting from the plurality of multimedia devices to provide a multimedia output signal to the IMD.

2. The system of claim 1 in which the plurality of multimedia devices includes a CD player.

3. The system of claim 1 in which the plurality of multimedia devices includes a personal computer.

4. The system of claim 1 in which the plurality of multimedia devices includes a video camera.

5. The system of claim 1 in which the plurality of multimedia devices includes a laser disk player.

6. The system of claim 1 in which the plurality of multimedia devices includes interactive multimedia decoder (IMD).

7. The system of claim 1 in which the plurality of multimedia devices includes at least one interactive multimedia device and at least one video camera to provide a point to point video system.

8. The system of claim 1 in which the plurality of multimedia devices includes at least one interactive multimedia device (IMD) and at least one video camera to provide a multipoint to point video system.

9. The system of claim 1 in which the system is utilized with a voice response system.

10. The system of claim 9 in which the voice response system provides a facsimile image on a display.

11. An interactive system for a closed cable network comprising:

means for processing multimedia information;

means coupled to the multimedia processing means for receiving telephone messages from and transmitting telephone messages to the multimedia processing means;

means coupled to the multimedia processing means for receiving account information from and transmitting account information to the multimedia processing means;

means coupled to the multimedia processing means for receiving control information from and transmitting control information to the multimedia processing means;

a plurality of multimedia devices coupled to the multimedia processing means to provide updatable multimedia information; and a global multimedia multiplexer (GMM), the GMM further including means for receiving inputs from the plurality of multimedia devices, and for selecting from the plurality of multimedia devices to provide a composite multimedia output signal to a plurality of interactive multimedia decoders.

12. An interactive system for a closed cable network comprising:

means for processing multimedia information;

means coupled to the multimedia processing means for receiving telephone messages from and transmitting telephone messages to the multimedia processing means;

means coupled to the multimedia processing means for receiving account information from and transmitting account information to the multimedia processing means;

means coupled to the multimedia processing means for receiving control information from and transmitting control information to the multimedia processing means;

a plurality of multimedia devices coupled to the multimedia processing means to provide updatable multimedia information, and a voice response system coupled to the telephone messages receiving transmitting means; the voice response system for providing facsimile images on a display.

* * * * *